United States Patent
Anchan

(10) Patent No.: US 9,681,419 B2
(45) Date of Patent: Jun. 13, 2017

(54) SEAMLESS AND RESOURCE EFFICIENT ROAMING FOR GROUP CALL SERVICES ON BROADCAST/MULTICAST NETWORKS

(71) Applicant: QUALCOMM Incorporated, San Diego, CA (US)

(72) Inventor: Kirankumar Bhoja Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 14/486,126

(22) Filed: Sep. 15, 2014

(65) Prior Publication Data
US 2015/0078245 A1    Mar. 19, 2015

Related U.S. Application Data

(60) Provisional application No. 61/878,497, filed on Sep. 16, 2013.

(51) Int. Cl.
H04W 4/00      (2009.01)
H04W 72/00     (2009.01)
(Continued)

(52) U.S. Cl.
CPC ......... *H04W 72/005* (2013.01); *H04M 13/00* (2013.01); *H04W 4/06* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 7,596,385 B2    9/2009   Aghvami et al.
7,957,376 B2    6/2011   Eriksson et al.
(Continued)

FOREIGN PATENT DOCUMENTS

WO    2008096258 A1    8/2008
WO    2014046686 A1    3/2014

OTHER PUBLICATIONS

"3rd Generation Partnership Project; Technical Specification Group Services and System Aspects; Study on architecture enhancements to support Group Communication System Enablers for LTE (GCSE_LTE) (Release 12)",3GPP Draft; TR 23768-030_MRK, 3rd Generation Partnership Project (3GPP), Mobile Competence Centre; 650, Route Des Lucioles ; F-06921 Sophia-Antipolis Cedex; France, Aug. 1, 2013 (Aug. 1, 2013), pp. 1-34 XP050725395, Retrieved from the Internet:URL:http://www.3gpp.org/ftp/.

(Continued)

*Primary Examiner* — Brenda H Pham
(74) *Attorney, Agent, or Firm* — Muncy, Geissler, Olds & Lowe, P.C.

(57) ABSTRACT

Various aspects and embodiments may provide seamless and resource efficient roaming for group call services on broadcast/multicast networks. In particular, upon a user equipment (UE) roaming or detecting an imminent move from a current Public Land Mobile Network (PLMN) to a Visited PLMN (VPLMN), an application server in a Home PLMN associated with the UE may determine whether to establish a multicast bearer in the VPLMN if the UE has preregistered for group call services in the VPLMN and provide the UE with information about bearers that will support the group call services in the VPLMN. For example, the multicast bearer may be established in the VPLMN if a number of users actively participating in the VPLMN exceeds a threshold, or the group call services may alternatively be (Continued)

supported over unicast service only if the number of actively participating users in the VPLMN is below the threshold.

41 Claims, 29 Drawing Sheets

(51) Int. Cl.
| | | |
|---|---|---|
| *H04M 13/00* | (2006.01) | |
| *H04W 36/32* | (2009.01) | |
| *H04W 4/06* | (2009.01) | |
| *H04W 76/00* | (2009.01) | |
| *H04W 36/00* | (2009.01) | |
| *H04W 84/04* | (2009.01) | |
| *H04W 4/08* | (2009.01) | |

(52) U.S. Cl.
CPC ........... *H04W 36/00* (2013.01); *H04W 36/32* (2013.01); *H04W 76/002* (2013.01); *H04W 4/08* (2013.01); *H04W 84/042* (2013.01)

(58) Field of Classification Search
CPC . H04W 84/18; H04W 36/18; H04W 36/0011; H04W 36/14; H04W 36/08
USPC ........... 370/310.2, 328, 338, 331; 455/432.1, 455/436, 442
See application file for complete search history.

(56) References Cited

U.S. PATENT DOCUMENTS

| | | | |
|---|---|---|---|
| 8,730,860 | B2 | 5/2014 | Lohmar et al. |
| 2007/0213078 | A1* | 9/2007 | Shaheen ............. H04W 76/002 455/466 |
| 2008/0298294 | A1* | 12/2008 | Gonsa ................. H04L 12/1818 370/312 |
| 2009/0219848 | A1* | 9/2009 | Lohmar ................. H04W 8/06 370/312 |
| 2009/0264097 | A1 | 10/2009 | Cai et al. |
| 2014/0120973 | A1 | 5/2014 | Agulnik et al. |
| 2015/0079979 | A1 | 3/2015 | Anchan |
| 2015/0230063 | A1* | 8/2015 | Chandramouli ...... H04W 4/005 455/466 |

OTHER PUBLICATIONS

Broadcom Corporation: "Architecture Solution for GCSE in multiple PLMN and roaming scenario", 3GPP Draft; S2-132488_Architecture_Solution_GCSE_Multiple_PLMN_Roaming_BRCM, 3rd Generation Partnership Project (3GPP), Mobile Competence Centre; 650, Route Des Lucioles ; F-06921 Sophia-Antipolis CE, Jul. 9, 2013 (Jul. 9, 2013), pp. 1-5, XP050725881, Retrieved from the Internet:URL:http://www.3gpp.org/ftp/tsg_sa/WG2_Arch/TSGS2_98_Valencia/Docs/ [retrieved on Jul. 9, 2013].
International Search Report and Written Opinion—PCT/US2014/055728—ISA/EPO—Feb. 23, 2015.

\* cited by examiner

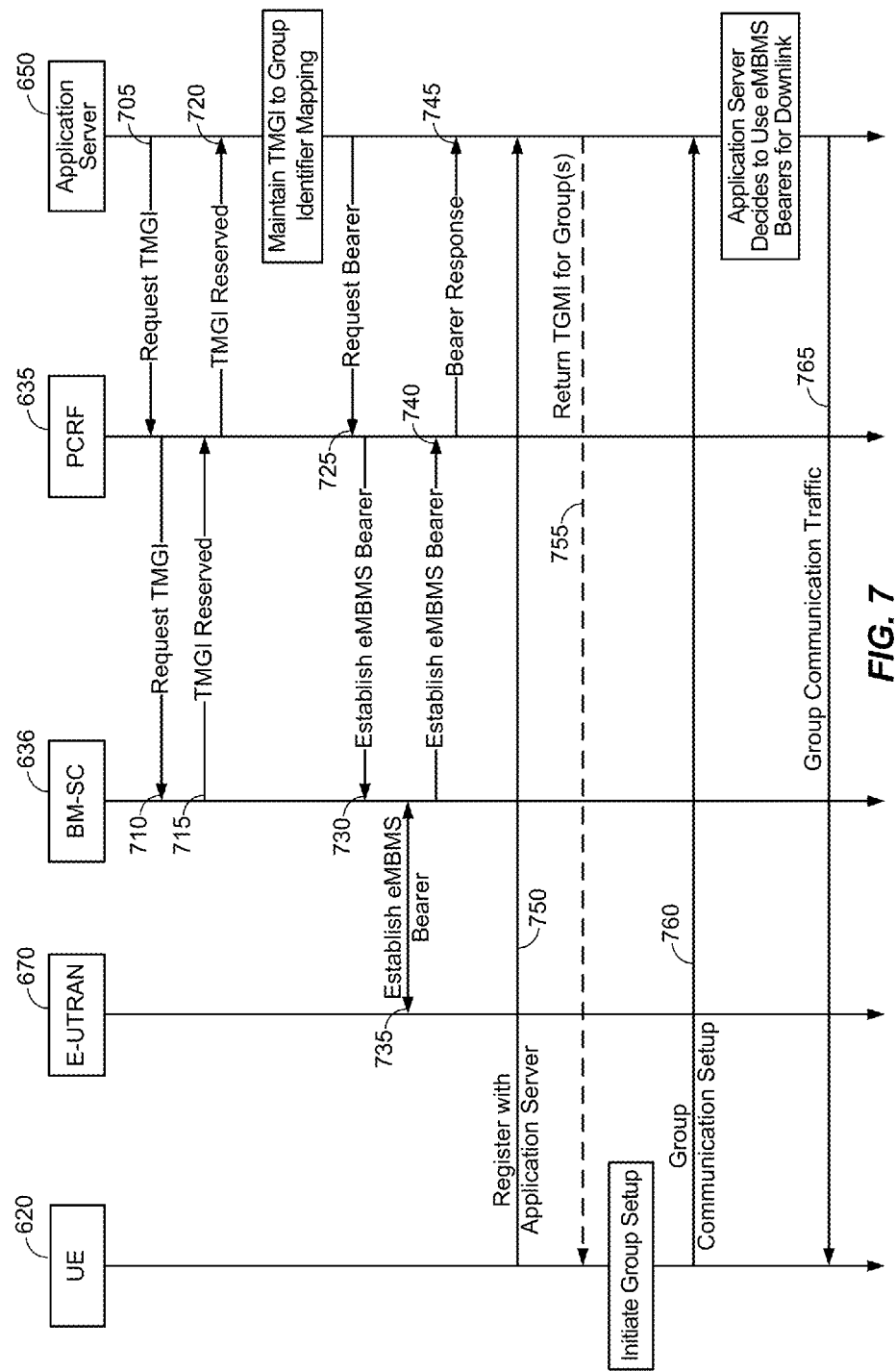

SEAMLESS AND RESOURCE EFFICIENT ROAMING FOR GROUP CALL SERVICES ON BROADCAST/MULTICAST NETWORKS

CROSS-REFERENCE TO RELATED APPLICATIONS

The present application claims the benefit of U.S. Provisional Patent Application Ser. No. 61/878,497 entitled "SEAMLESS AND RESOURCE EFFICIENT ROAMING FOR GROUP CALL SERVICES ON BROADCAST/MULTICAST NETWORKS," filed on Sep. 16, 2013, which is assigned to the assignee hereof and hereby expressly incorporated herein by reference in its entirety.

In addition, the present application is related to concurrently filed U.S. patent application Ser. No. 14/486,037 entitled "SEAMLESS AND RESOURCE EFFICIENT ROAMING FOR GROUP CALL SERVICES ON BROADCAST/MULTICAST NETWORKS", which further claims the benefit of U.S. Provisional Patent Application 61/878,497, and which is further assigned to the assignee hereof and hereby expressly incorporated herein by reference in its entirety.

TECHNICAL FIELD

Various embodiments generally relate to wireless communications, and more particularly, to techniques that may support application server assisted, resource efficient, and seamless roaming for group call services on evolved multimedia broadcast/multicast (eMBMS) networks, Long Term Evolution (LTE) networks, and/or other suitable networks that support broadcast/multicast services.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users (e.g., a news broadcast). A multicast service is a service that may be received by a group of users (e.g., a subscription video service). A unicast service is a service intended for a specific user (e.g., a voice call). Group communications can be implemented using either unicast, broadcast, multicast, or combinations thereof. As the group becomes larger, using multicast services may generally be more efficient. However, for group communication services that require low latency and a short time to establish the group communication, the setup time of conventional multicast channels can be a detriment to performance.

For example, to provide large group call services in dense user areas according to the evolved multimedia broadcast/multicast services (eMBMS) standard, the bearers for multicast calls are typically established statically or semi-statically (i.e., the bearers need to be established before the call starts). Consequently, the target area associated with a multicast call has to be identified, the network components have to be connected, and the group member list needs to be pre-provisioned before the call starts, which tends to results in a static group experience. Furthermore, when a group call crosses home network boundaries due to user mobility, there may be a need to provide service in roaming networks (e.g., visited networks). However, the services provided under the current eMBMS standard are not designed to provide seamless operation in roaming scenarios. Instead, services currently provided under the existing eMBMS standard are generally designed to terminate when home network boundaries are crossed. Moreover, no group calling services currently exist on the eMBMS standard except for the current proposals in 3GPP Release 12 specifications for group communication, specifically for critical communication services.

SUMMARY

The following presents a simplified summary relating to one or more aspects and/or embodiments described herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments described herein in a simplified form to precede the detailed description presented below.

According to various embodiments, a method for seamless and resource efficient roaming for group call services on broadcast/multicast networks may comprise, among other things, determining, at a server located in a Home Public Land Mobile Network (HPLMN), that a user equipment (UE) associated with the HPLMN has registered to participate in a group call in a current PLMN and is expected to cross a boundary from the current PLMN to a Visited PLMN (VPLMN) (e.g., in response to determining that the UE is not registered in the current PLMN, has attached to the VPLMN, etc.), detecting that the UE has roamed to the VPLMN, determining whether to establish a multicast bearer in the VPLMN in response to the UE pre-registering for eMBMS services in the VPLMN, and providing the UE with information about one or more bearers that will support the group call in the VPLMN. For example, in various embodiments, the multicast bearer may be established in the VPLMN in response to determining that a number of group call participants in the VPLMN exceeds a threshold, in which case the information provided to the UE about the one or more bearers that will support the group call in the VPLMN may comprise information about the multicast bearer established in the VPLMN. Alternatively, the information provided to the UE about the bearers that will support the group call in the VPLMN may comprise a notification that the group call will only be supported over unicast service if the number of group call participants in the VPLMN does not exceed the threshold. Furthermore, the multicast bearer (if established in the VPLMN) may be deactivated in response to determining that the number of group call participants in the VPLMN no longer exceeds the threshold, or the established multicast bearer may be maintained based on one or more policies (e.g., the number of roaming users in the VPLMN, call activity, etc.).

According to various embodiments, a Home Public Land Mobile Network (HPLMN) for supporting seamless and resource efficient roaming for group call services in an eMBMS network may comprise a server configured to determine that a UE associated with the HPLMN is expected to cross a boundary from a current PLMN to a VPLMN, wherein the UE has registered to participate in a group call in the current PLMN, detect that the UE has roamed to the VPLMN, determine whether to establish a multicast bearer in the VPLMN in response to the UE pre-registering for eMBMS services in the VPLMN based at least in part on a number of group call participants in the VPLMN, and provide the UE with information about one or more bearers that will support the group call in the VPLMN. For example, in various embodiments, the server may be configured to establish the multicast bearer in the VPLMN in response to the number of group call participants in the VPLMN exceeding a threshold, in which case the information about the bearers that will support the group call in the VPLMN may comprise information about the multicast bearer established in the VPLMN. Alternatively, the server may be configured to establish a unicast bearer in the VPLMN in response to the number of group call participants in the VPLMN not exceeding the threshold and then notify the UE that the group call will be supported over the unicast bearer.

According to various embodiments, a server for supporting seamless and resource efficient roaming for group call services in an eMBMS network may comprise means for determining that a UE associated with an HPLMN is expected to cross a boundary from a current PLMN to a VPLMN, wherein the tracked UE has registered to participate in a group call in the current PLMN, means for detecting that the UE has roamed to the VPLMN, means for determining whether to establish a multicast bearer in the VPLMN in response to the UE pre-registering for eMBMS services in the VPLMN based at least in part on a number of group call participants in the VPLMN, and means for providing the UE with information about one or more bearers that will support the group call in the VPLMN.

According to various embodiments, a computer-readable storage medium may have computer-executable instructions recorded thereon, wherein executing the computer-executable instructions on a server located in a Home Public Land Mobile Network (HPLMN) may cause the server to determine that a UE associated with the HPLMN is expected to cross a boundary from a current PLMN to a VPLMN, wherein the UE has registered to participate in a group call in the current PLMN, detect that the UE has roamed to the VPLMN, determine whether to establish a multicast bearer in the VPLMN in response to the UE pre-registering for eMBMS services in the VPLMN based at least in part on a number of group call participants in the VPLMN, and provide the UE with information about one or more bearers that will support the group call in the VPLMN.

Other objects and advantages associated with the various aspects and the various embodiments described herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 7 illustrates an exemplary call flow that can support group communications using pre-established eMBMS bearers in a home network according to various embodiments.

DETAILED DESCRIPTION

Figure 1:
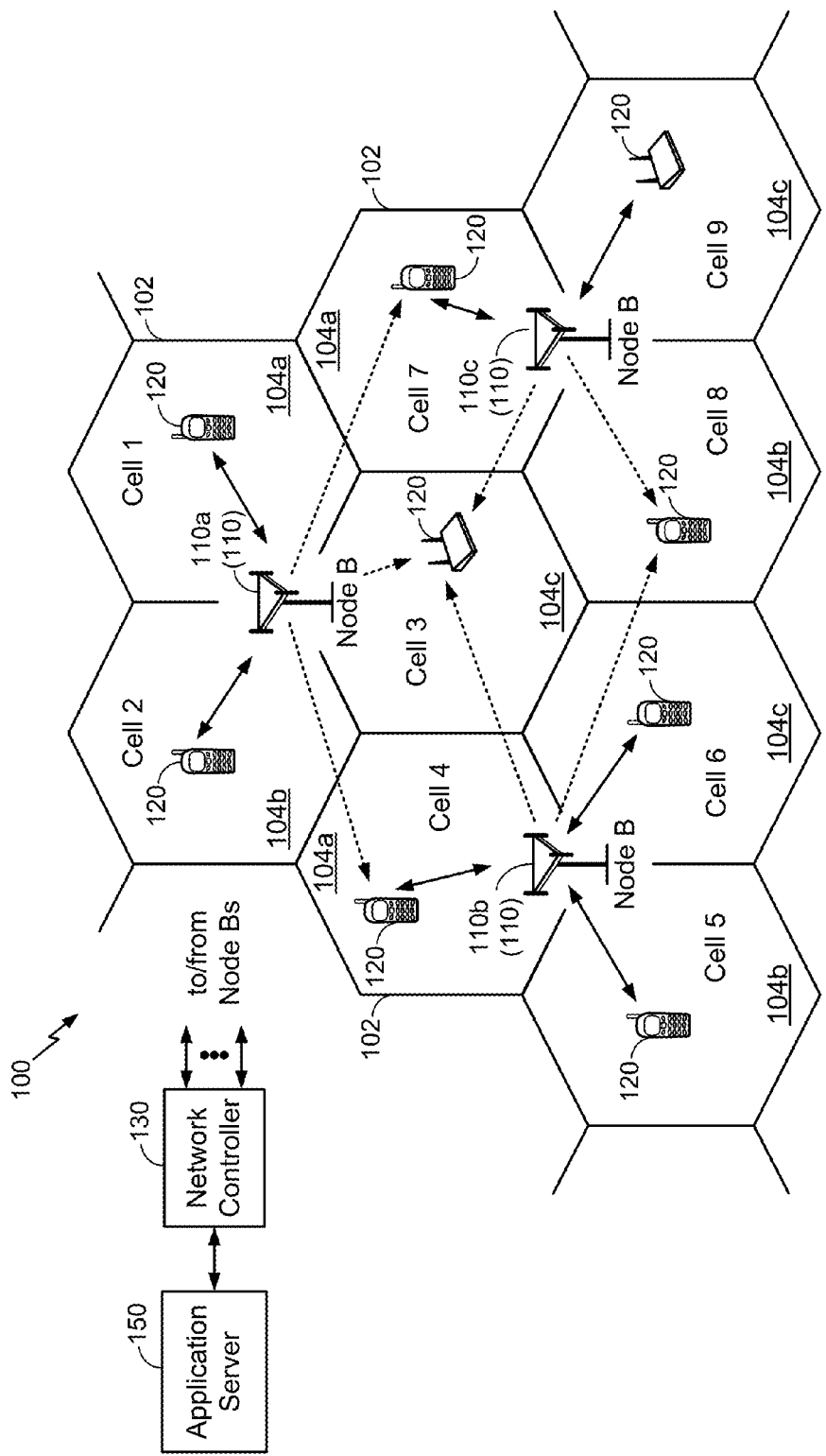
FIG. 1 illustrates an exemplary wireless communication system according to various embodiments.

Various aspects and embodiments are described in the following description and related drawings. Alternate aspects and embodiments may be devised without departing from the scope of the various aspects and embodiments described herein. Additionally, well-known elements of the aspects and embodiments described herein will not be described in detail or will be omitted so as not to obscure the relevant details thereof.

The words "exemplary" and/or "example" are used herein to mean "serving as an example, instance, or illustration."

Any aspect and/or embodiment described herein as "exemplary" and/or "an example" is not necessarily to be construed as preferred or advantageous over other aspects and/or embodiments. Likewise, terms such as "aspect" and/or "embodiment" do not require all aspects and/or embodiments to include the discussed feature, advantage, or mode of operation. Further, as used herein, the term "group communication," "push-to-talk," and/or other similar variations are meant to refer to a server arbitrated service between two or more devices.

The terminology used herein is for the purpose of describing particular aspects and/or embodiments only and is not intended to be limiting of any described aspects and/or embodiments. As used herein, the singular forms "a," "an," and "the" are intended to include the plural forms as well, unless the context clearly indicates otherwise. Those skilled in the art will further understand that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects and/or embodiments may be described in terms of actions to be performed by, for example, elements of a computing device. Those skilled in the art will recognize that various actions described herein can be performed by specific circuits (e.g., an application specific integrated circuit (ASIC) or another suitable circuit), by program instructions being executed by one or more processors, or combinations thereof. Additionally, the actions described herein can be considered to be embodied entirely within any form of computer readable storage medium having stored therein a corresponding set of computer instructions that upon execution would cause an associated processor to perform the functionality described herein. Thus, the various aspects and embodiments described herein may be embodied in various forms, which have all been contemplated to be within the scope of the claimed subject matter. In addition, for each aspect and/or embodiment described herein, the corresponding form of any such aspect and/or embodiment may be described herein as, for example, "logic configured to" perform the described action.

The techniques described herein may be used for various cellular communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from an organization named "3rd Generation Partnership Project" (3GPP). CDMA2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system or other suitable access network. The communication system 100 may include a number of Node Bs and other network entities. For simplicity, only three Node Bs 110a, 110b, and 110c (any of which may also referred to as Node B 110) are shown in FIG. 1. Any particular Node B 110 may be a fixed station used for communicating with user equipments (UEs) 120 and may also be referred to as an evolved Node B (eNB), a base station, an access point, etc. Each Node B 110 provides communication coverage for a particular geographic area 102. To improve system capacity, the overall coverage area of the Node B 110 may be partitioned into multiple smaller areas (e.g., three smaller areas 104a, 104b and 104c). Each smaller area may be served by a respective system associated with a particular Node B 110. In 3GPP, the term "cell" can refer to the smallest coverage area of the Node B 110 and/or a subsystem associated therewith that serves this coverage area. In other systems, the term "sector" can refer to the smallest coverage area of a base station and/or a base station subsystem serving this coverage area. For clarity, the 3GPP concept of a cell is used in the description provided below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow the UE 120 to receive coverage from one or more cells at any location as the UE 120 moves about the system.

The UEs 120 may be dispersed throughout the system, and each UE 120 may be stationary or mobile. The UE 120 may also be referred to as a mobile station, a terminal, an access terminal, a subscriber unit, a station, etc. The UE 120 may be a cellular phone, a personal digital assistant (PDA), a wireless modem, a wireless communication device, a handheld device, a laptop computer, a cordless phone, etc. The UE 120 may communicate with the Node B 110 via transmissions on the downlink and uplink. The downlink (or forward link) refers to the communication link from the Node B 110 to the UE 120, and the uplink (or reverse link) refers to the communication link from the UE 120 to the Node B 110. In FIG. 1, a solid line with double arrows indicates bi-directional communication between the Node B 110 and the UE 120. A dashed line with a single arrow indicates the UE 120 receiving a downlink signal from the Node B 110 (e.g., for broadcast and/or multicast services). The terms "UE" and "user" are used interchangeably herein.

Network controller 130 may couple to multiple Node Bs 110 to provide coordination and control for the Node Bs 110 under the control of the network controller 130, and to route data for terminals served by the Node Bs 110 under the control of the network controller 130. The communication system 100 shown in FIG. 1 may also include other network entities not shown in FIG. 1. Further, as illustrated, the network controller 130 may be operably coupled to an application server 150 to provide group communication services to the UEs 120 through the communication system 100. Those skilled in the art will appreciate that there can be many other network and system entities that can be used to facilitate communications between the UEs 120 and servers (e.g., the application server 150) and information outside of the access network. Accordingly, various embodiments are not limited to the specific arrangement or elements detailed in the various figures.

Figure 2:
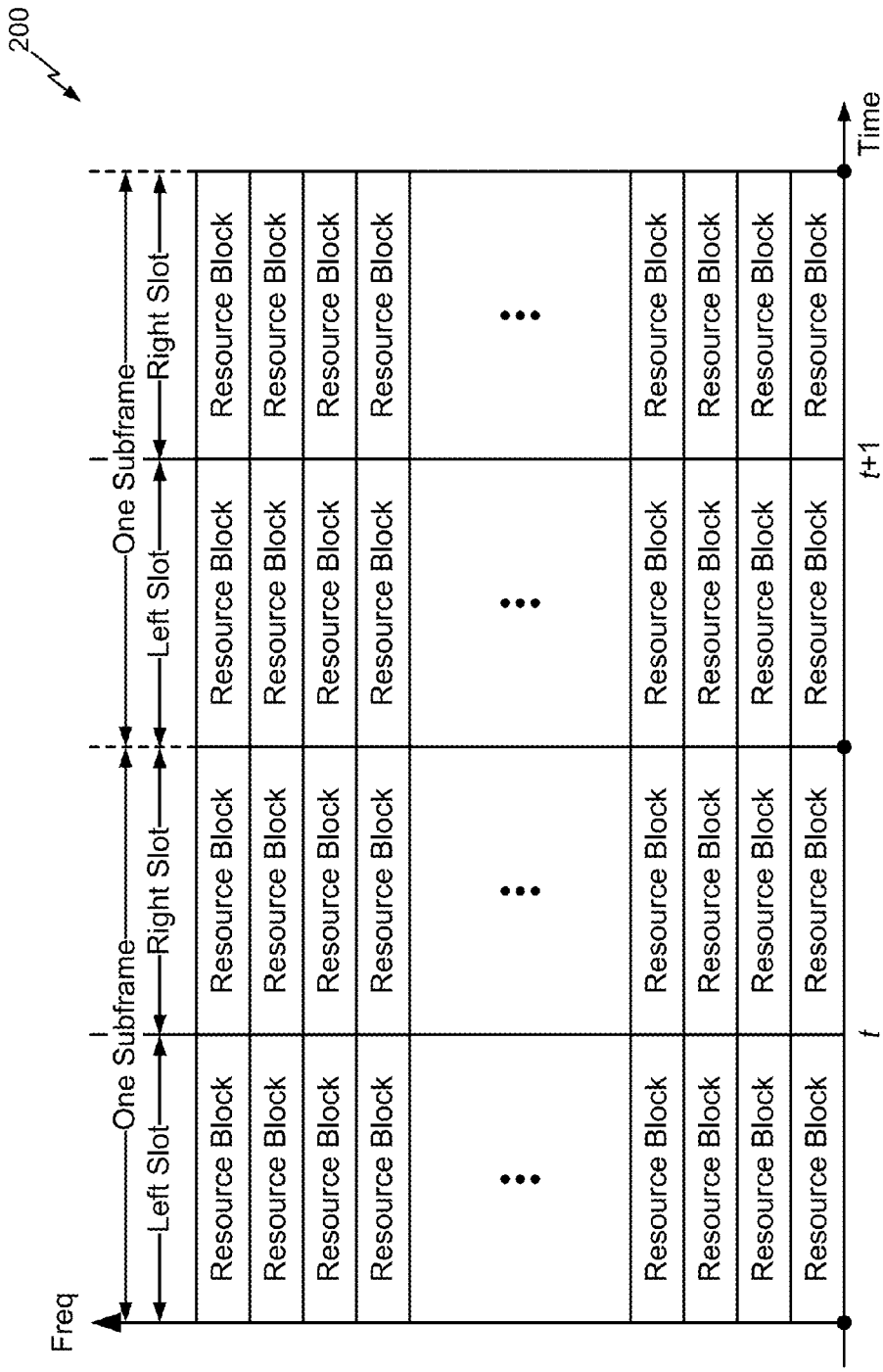
FIG. 2 illustrates an exemplary transmission structure according to various embodiments.

FIG. 2 shows an exemplary transmission structure 200 that may be used for the downlink in the communication system 100 shown in FIG. 1. With reference to FIG. 2, the transmission timeline may be partitioned into units of radio frames. Each radio frame may have a predetermined duration (e.g., 10 milliseconds) and may be partitioned into 10 sub-frames. Each sub-frame may include two slots, and each slot may include a fixed or configurable number of symbol periods (e.g., six or seven symbol periods).

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information. |
| Broadcast Channel | BCH | T | Carry master system Information. |
| eMBMS Traffic Channel | MTCH | L | Carry configuration information for eMBMS services. |
| Multicast Channel | MCH | T | Carry the MTCH and MCCH. |
| Downlink Shared Channel | DL-SCH | T | Carry the MTCH and other logical channels. |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH. |
| Physical Downlink Control Channel | PDCCH | P | Carry control information for the DL-SCH. |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN area configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:
 Content for broadcast or multicast services can be transmitted synchronously across multiple cells.
 Radio resources for broadcast and multicast services are allocated by an MBMS Coordinating Entity (MCE), which may be logically located above the Node Bs.
 Content for broadcast and multicast services is mapped on the MCH at a Node B.
 Time division multiplexing (e.g., at sub-frame level) of data for broadcast, multicast, and unicast services.

The single-cell mode may have the following characteristics:
 Each cell transmits content for broadcast and multicast services without synchronization with other cells.
 Radio resources for broadcast and multicast services are allocated by the Node B.
 Content for broadcast and multicast services is mapped on the DL-SCH.
 Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 3A:
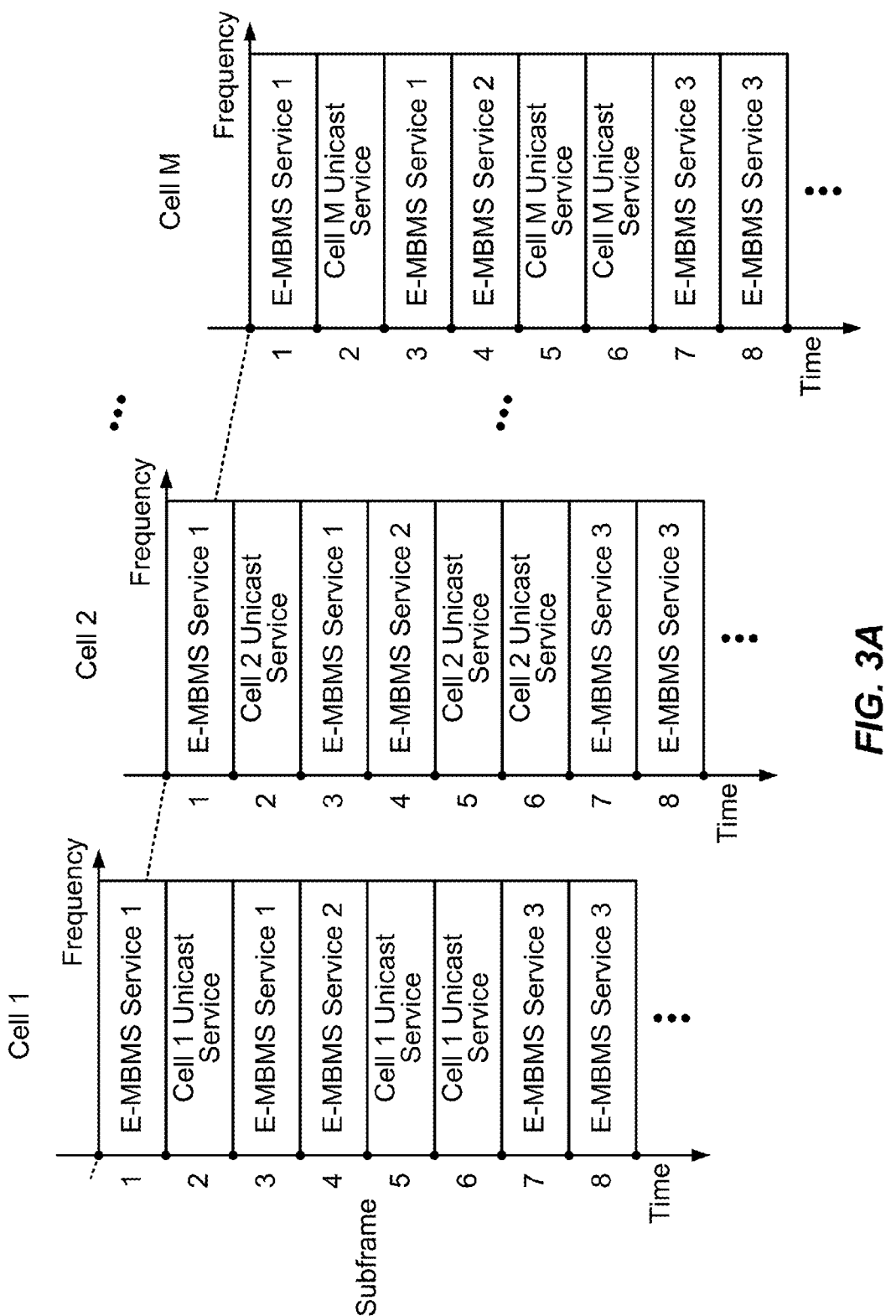
FIG. 3A illustrates exemplary transmissions of different services in a multi-cell mode according to various embodiments.

FIG. 3A shows exemplary transmissions of eMBMS and unicast services by M cells 1 through M in the multi-cell mode, where M may be any integer value. For each cell, the vertical axis may represent time, and the horizontal axis may represent frequency. In one design of eMBMS, which is assumed for much of the description below, the transmission timeline for each cell may be partitioned into time units of sub-frames. In other designs of eMBMS, the transmission timeline for each cell may be partitioned into time units of other durations. In general, a time unit may correspond to a sub-frame, a slot, a symbol period, multiple symbol periods, multiple slots, multiple sub-frames, etc.

In the example shown in FIG. 3A, the M cells transmit three eMBMS services 1, 2, and 3. All M cells transmit eMBMS service 1 in sub-frames 1 and 3, eMBMS service 2 in sub-frame 4, and eMBMS service 3 in sub-frames 7 and 8. The M cells transmit the same content for each of the three eMBMS services. Each cell may transmit its own unicast service in sub-frames 2, 5, and 6. The M cells may transmit different contents for their unicast services.

Figure 3B:
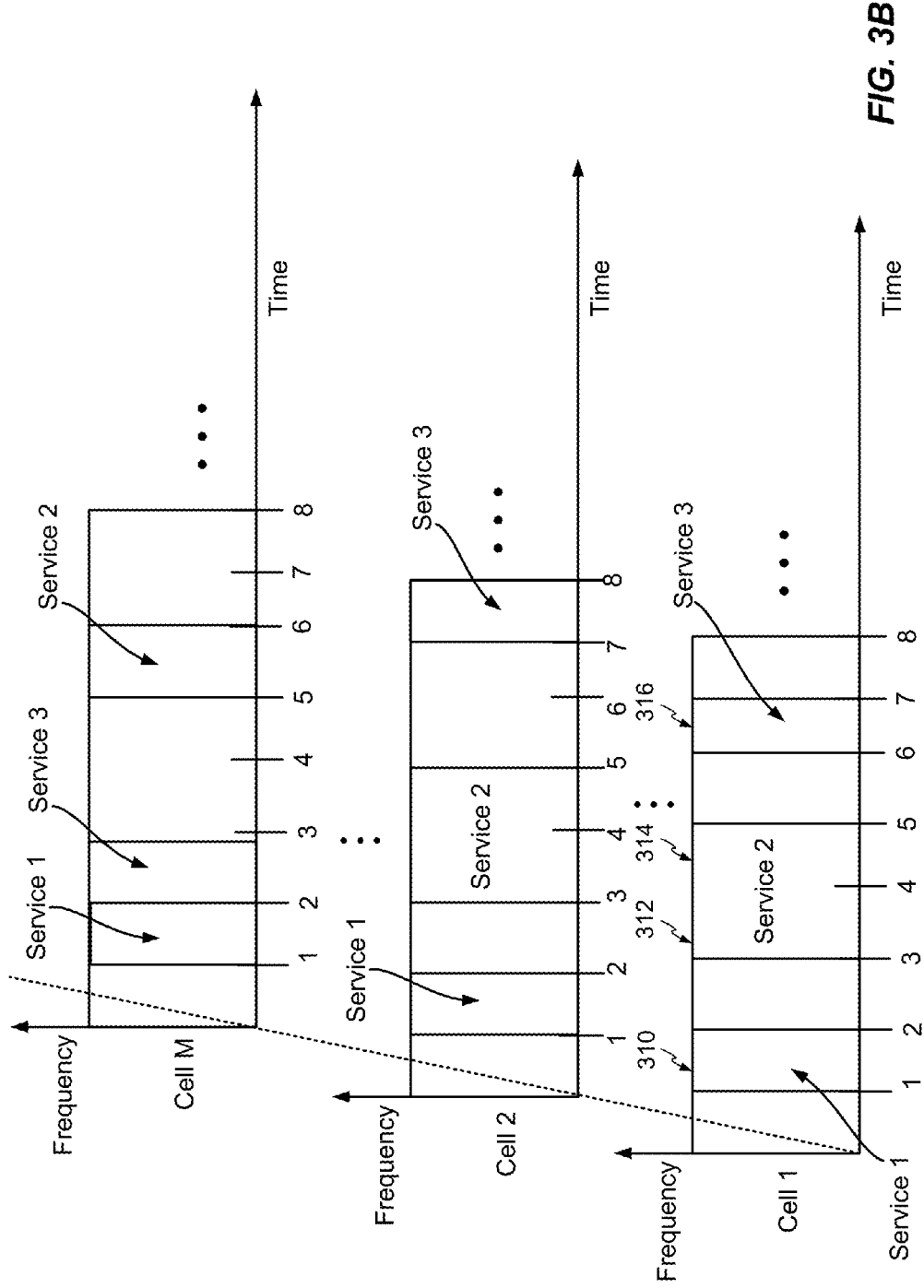
FIG. 3B illustrates exemplary transmissions of different services in a single-cell mode according to various embodiments.

FIG. 3B shows example transmissions of eMBMS and unicast services by M cells in the single-cell mode. For each cell, the horizontal axis may represent time, and the vertical axis may represent frequency. In the example shown in FIG. 3B, the M cells transmit three eMBMS services 1, 2, and 3. Cell 1 transmits eMBMS service 1 in one time frequency block 310, eMBMS service 2 in a time frequency blocks 312 and 314, and eMBMS service 3 in one time frequency blocks 316. Similarly, other cells transmit services 1, 2, and 3 as shown in the FIG. 3B.

In general, an eMBMS service may be sent in any number of time frequency blocks. The number of sub-frames may be dependent on the amount of data to send and possibly other factors. The M cells may transmit the three eMBMS services 1, 2, and 3 in time frequency blocks that may not be aligned in time and frequency, as shown in FIG. 3B. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 3A and 3B show example designs of transmitting eMBMS services in the multi-cell mode and the single-cell mode. However, those skilled in the art will appreciate that eMBMS services may also be transmitted using time division multiplexing (TDM) and/or other mechanisms in the multi-cell and single-cell modes.

As noted in the foregoing, eMBMS services can be used to distribute multicast data to groups and could be useful for Push-to-Talk (PTT) calls or other group calls. Conventional applications on eMBMS have a separate service announcement and discovery mechanism. Further, communications on pre-established eMBMS flows are always on even on the air interface. Power saving optimization must be applied to put the UE to sleep when a call or communication is not in progress, which is typically achieved using out-of-band service announcements on unicast or multicast user plane data. Alternatively, an application layer paging channel mechanism may be used to put the UE to sleep. Since the application layer paging mechanism has to remain active, the application layer paging mechanism can consume bandwidth on a multicast sub-frame that could otherwise be idle in the absence of the application layer paging mechanism. Additionally, since the multicast sub-frame will be active while using the application layer paging, the remainder of the resource blocks within the sub-frame cannot be used for unicast traffic. Thus, the total 5 MHz bandwidth will be consumed for the sub-frame for instances when application layer paging is scheduled without any other data.

Figure 4:
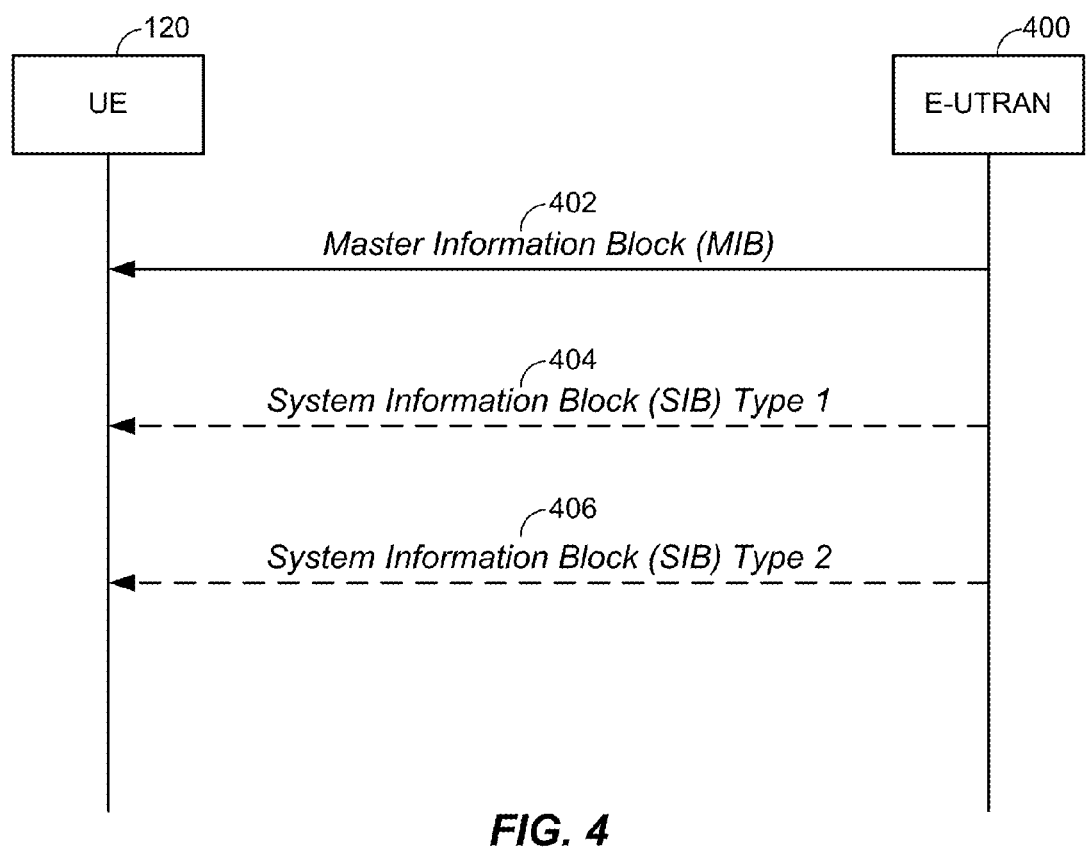
FIG. 4 illustrates an exemplary communication between a user equipment (UE) and an evolved universal terrestrial radio access network (E-UTRAN) according to various embodiments.

Referring to FIG. 4, system information is provided by radio resource control (RRC), and is structured in master information blocks (MIBs) and system information blocks (SIBs). With reference to FIGS. 1-4, a MIB 402 is transmitted in fixed location time slots and includes parameters to aid the UE 120 in locating a SIB Type 1 (SIB1) message 404 scheduled on the DL-SCH (e.g., DL bandwidth and system frame number). The SIB1 message 404 contains information relevant to scheduling the other system information and information on access to a cell. The other SIBs are multiplexed in system information messages. A SIB Type 2 (SIB2) message 406 contains resource configuration information that is common to all UEs 120 and information on access barring. An evolved universal terrestrial RAN (E-UTRAN) 400 controls user access by broadcasting access class barring parameters in the SIB2 message 406, and the UE 120 performs actions according to the access class in its universal subscriber identity module (USIM).

All UEs (e.g., 120) that are members of access classes one to ten are randomly allocated mobile populations, defined as access classes 0 to 9. The population number is stored in the SIM/USIM. In addition, UEs may be members of one or more of five special categories (access classes 11 to 15) also held in the SIM/USIM. The standard defines these access classes as follows (3GPP TS 22.011, Section 4.2):

Class 15—Public Land Mobile Network (PLMN) Staff;
Class 14—Emergency Services;
Class 13—Public Utilities (e.g. water/gas suppliers);
Class 12—Security Services; and
Class 11—For PLMN Use.

A SIB2 message contains the following parameters for access control:

For regular users with Access Class 0 to 9, the access is controlled by ac-BarringFactor and ac-BarringTime parameters in the SIB2 message.

For users initiating emergency calls (AC 10) the access is controlled by the ac-BarringForEmergency parameter, indicating whether access barring is enforced or not enforced.

For UEs with AC 11 to 15, the access is controlled by the ac-BarringForSpecialAC parameter, indicating whether access barring is enforced or not enforced.

A UE is allowed to perform access procedures when the UE is a member of at least one access class that corresponds to the permitted classes as signaled over the air interface.

The UEs generate a random number to pass the "persistent" test in order for the UE to gain access. To gain access, a UE random number generator's outcome needs to be lower than the threshold set in the ac-BarringFactor. By setting the ac-BarringFactor to a lower value, the access from regular users is restricted. The users with access class 11 to 15 can gain access without any restriction.

Figure 5A:
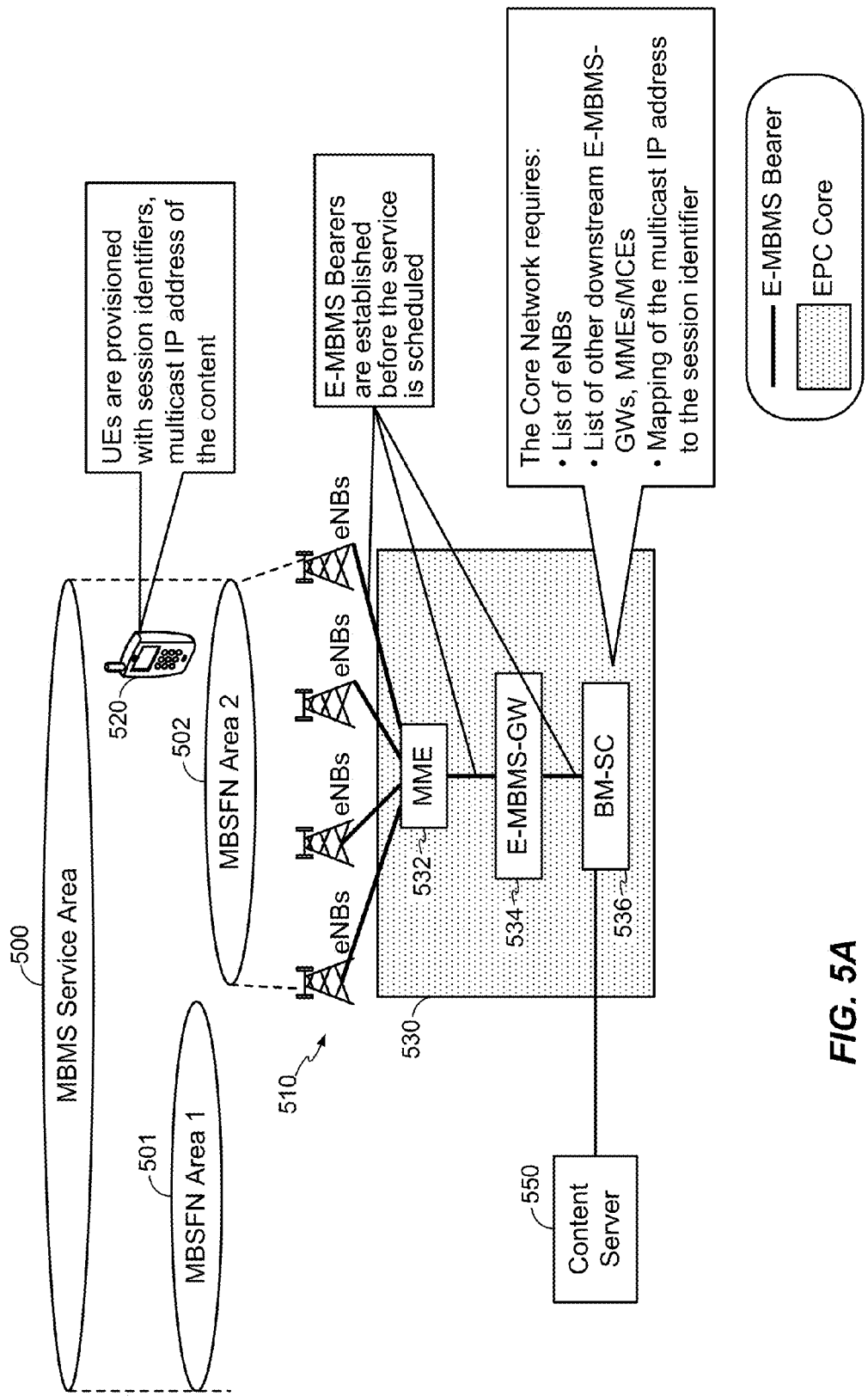
FIGS. 5A-5D illustrate exemplary high-level system architectures corresponding to additional wireless communication systems that can support broadcast/multicast services according to various embodiments.

FIG. 5A is another illustration of a wireless network that can implement evolved multimedia broadcast/multicast services (eMBMS) or MBMS services, which are used interchangeably herein. With reference to FIGS. 1-5A, an MBMS service area 500 can include multiple MBSFN areas (e.g., MBSFN Area 1 501 and MBSFN Area 2 502). Each MBSFN Area 501, 502 can be supported by one or more eNode Bs (eNBs) 510, which are coupled to a core network 530. The core network 530 can include various elements (e.g., a Mobility Management Entity (MME) 532, an eMBMS gateway (eMBMS-GW) 534, a broadcast/multicast service center (BM-SC) 536, etc.) that may facilitate controlling and distributing content from content server 550 (which may include an application server, such as the application server 150, etc.) to the MBMS service area 500. The core network 530 may require a list of the eNBs 510, other downstream eMBMS-GWs 534, MMEs 532, and/or other elements (e.g., MCEs) within the core network 530 and a mapping between multicast IP addresses and session identifiers. A particular UE 520 (e.g., UE 120) within the network can be provisioned with session identifiers and multicast IP addresses associated with the content sent thereto. Typically, the MME 532 is a key control node for an LTE access network, wherein the MME 532 is responsible for idle mode UE tracking and paging procedures including retransmissions. The MME 532 is also involved in bearer activation/deactivation processes, responsible for choosing a serving gateway (S-GW) for the UE 520 at the initial attach and at time of intra-LTE handover involving core network 530 node relocation, and responsible for user authentication. The MME 532 can also check the authorization of the UE 520 to camp on the service provider's Public Land Mobile Network (PLMN) and enforce roaming restrictions. The MME 532 is the termination point in the network 530 for ciphering and integrity protection for Non Access Stratum (NAS) signaling and handles security key management and also provides control plane functions for mobility between LTE and 2G/3G access networks with an S3 interface terminating at the MME 532.

Figure 5B:
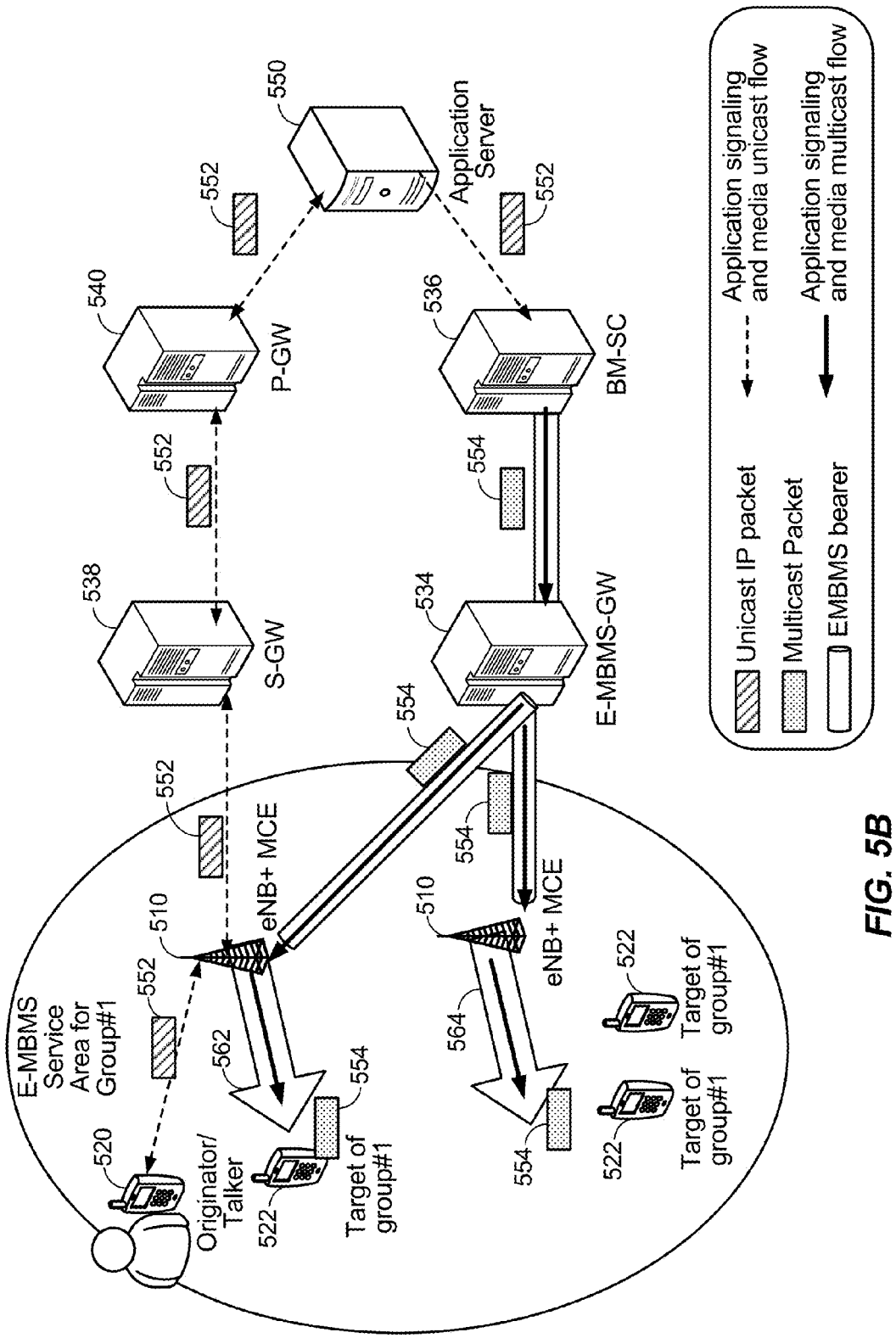

FIG. 5B is another illustration of a wireless network that can implement multimedia broadcast/multicast services (MBMS) as described herein. With reference to FIGS. 1-5B, in the illustrated network, an application server 550 (e.g., a PTT server) can serve as the content server 550. The application server 550 can communicate media in unicast packets 552 to the core network 530 where the content can be maintained in a unicast configuration and transmitted as unicast packets to a given UE 520 (e.g., an originator or talker) through a Packet Data Network (PDN) Gateway (P-GW) 540 and/or a serving gateway (S-GW) 538. Alternatively, the application server 550 can communicate the media in unicast packets 552 to the BM-SC 536, which can then convert the unicast packets 552 to multicast packets 554, which can then be transported to target UEs 522 (e.g., via eMBMS-GW 534). For example, a PTT call can be initiated by UE 520 by communicating with the application server 550 via unicast packets 552 over a unicast channel. Furthermore, for the call originator and/or the call talker, both the application signaling and media may be communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, in this example, both the application signaling and media can be communicated over the multicast flow in the downlink or the forward link. Unlike conventional systems, having both the application signaling and the media in the multicast flow avoids the need to have a separate unicast channel for the application signaling. However, to allow for application signaling over the multicast flow of the illustrated system, an evolved packet system (EPS) bearer will be established (and persistently on) between the BM-SC 536, eMBMS-GW 534, eNBs 510, and target UEs 522.

In accordance with various embodiments, some of the downlink channels related to eMBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub-frames on physical layer. MCH is a downlink only channel. A single transport block is used per sub-frame. Different services (MTCHs) can be multiplexed in this transport block.

In LTE, the control and data traffic for multicast is delivered over MCCH and MTCH, respectively. The Medium Access Control Protocol Data Units (MAC PDUs) for the UEs 520, 522 indicate the mapping of the MTCH and the location of the particular MTCH within a sub-frame. An MCH Scheduling Information (MSI) MAC control element is included in the first sub-frame allocated to the MCH within the MCH scheduling period to indicate the position of each MTCH and unused sub-frames on the MCH. For eMBMS user data, which is carried by the MTCH logical channel, MSI periodically provides at lower layers (e.g., MAC layer information) the information on decoding the MTCH. In various embodiments, the MSI scheduling can be configured and scheduled prior to the MTCH sub-frame interval.

To achieve low latency and reduce control signaling, one eMBMS flow (e.g., flows 562 and 564 in FIG. 5B) can be activated for each service area. Depending on the data rate, multiple multicast flows can be multiplexed on a single slot. PTT UEs (e.g., target UEs 522) can ignore and "sleep" between scheduled sub-frames and reduce power consumption when no unicast data is scheduled for the particular target UE 522. The MBSFN sub-frame can be shared by groups in the same MBSFN service area. MAC layer signaling can be leveraged to "wake-up" the application layer (e.g., PTT application) for the target UEs 522.

Various embodiments can use two broadcast streams, each a separate eMBMS flow over an LTE broadcast flow having a respective application level broadcast stream and multicast IP address, for each defined broadcast region (e.g., a subset of sectors within the network), such as MBSFN Area 1 501 and MBSFN Area 2 502 in FIG. 5A. Furthermore, although the broadcast regions corresponding to MBSFN Area 1 501 and MBSFN Area 2 502 are illustrated in FIG. 5A as separate broadcast regions, those skilled in the art will appreciate that different broadcast regions (e.g., MBSFN Area 1 501 and MBSFN Area 2 502) may overlap.

Figure 5C:
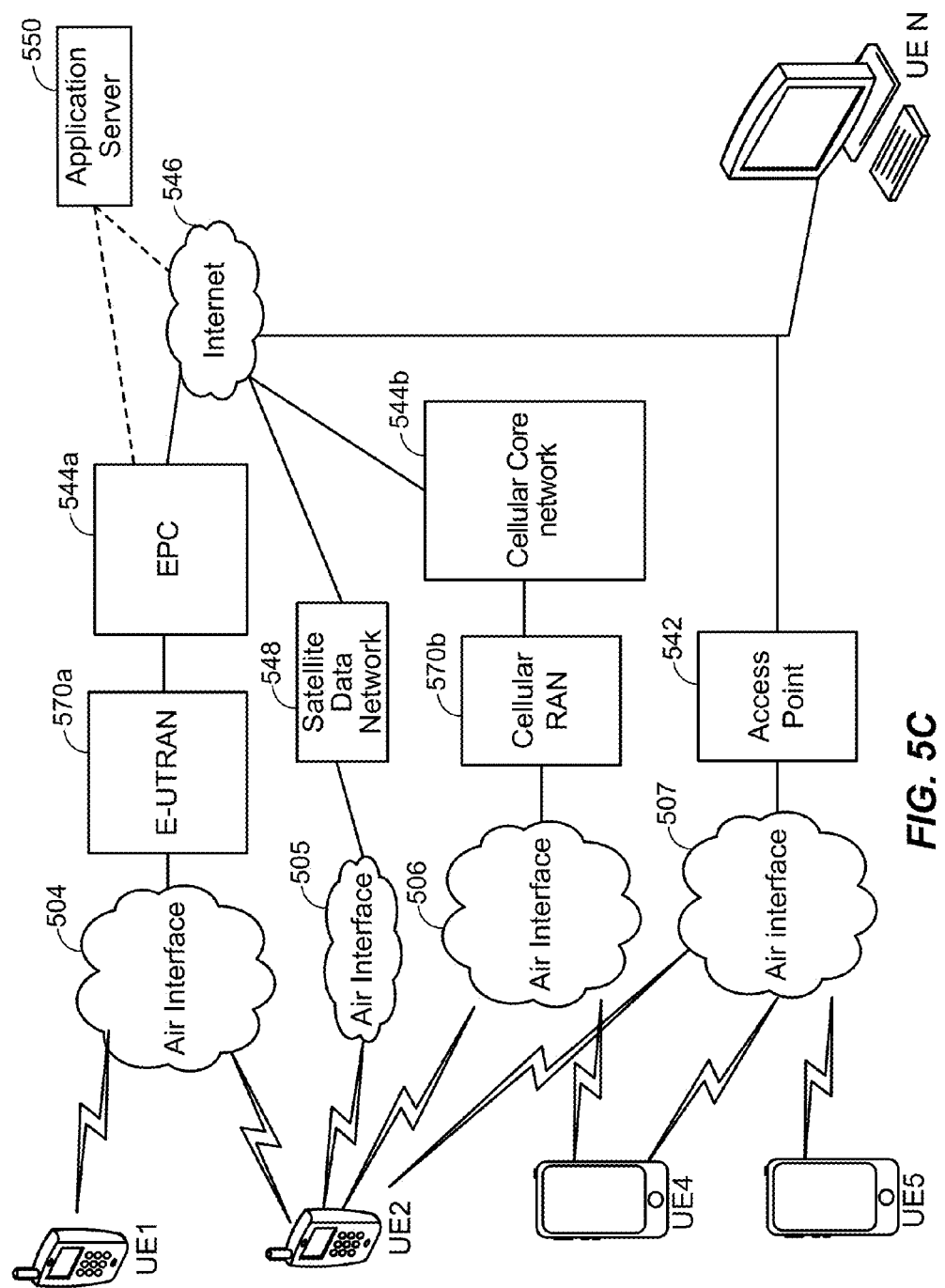

FIG. 5C illustrates another high-level system architecture of a wireless communications system that can support broadcast/multicast services, according to various embodiments. The wireless communications system shown in FIG. 5C may include various UEs 1 . . . N, which can include cellular telephones, personal digital assistant (PDAs), pagers, laptop computers, desktop computers, and so on.

Referring to FIGS. 1-5C, UEs 1 . . . N (e.g., 120, 520, 522) may be configured to communicate with an access network (e.g., an evolved UMTS terrestrial radio access network (E-UTRAN) 570a, a cellular RAN 570b, a satellite data network 548, an access point 542, etc.) over a physical communications interface or layer, which may include air interfaces 504, 505, 506, 507 and/or a direct wired connection. The air interfaces 504 and 506 can comply with a given cellular communications protocol (e.g., CDMA, EVDO, eHRPD, GSM, EDGE, W-CDMA, LTE, etc.), while the air interface 507 can comply with a wireless IP protocol (e.g., IEEE 802.11) and the air interface 505 can comply with a satellite data network protocol. The E-UTRAN 570a and the cellular RAN 570b can include various access points that serve UEs over air interfaces, such as the air interfaces 504 and 506. The access points in the E-UTRAN 570a and the cellular RAN 570b can be referred to as access nodes or ANs, access points or APs, base stations or BSs, Node Bs, eNode Bs, and so on. These access points can be terrestrial access points (or ground stations), or satellite access points. The E-UTRAN 570a and the cellular RAN 570b are respectively configured to connect to an evolved packet core (EPC) 544a and a cellular core network 544b, which can perform various functions, including bridging circuit switched (CS) calls between UEs served by the E-UTRAN 570a and the cellular RAN 570b and other UEs served by the E-UTRAN 570a and the cellular RAN 570b or a different RAN altogether. Furthermore, the EPC 544a and cellular core network 544b can also mediate an exchange of packet-switched (PS) data with external networks such as Internet 546.

The Internet 546 includes various routing agents and processing agents (not shown in FIG. 5C for the sake of convenience). The UE N is shown as connecting to the Internet 546 directly (i.e., separate from the EPC 544a and cellular core network 544b, such as over an Ethernet connection or Wi-Fi or 802.11-based network). The Internet 546 can thereby function to bridge packet-switched data communications between UE N and UEs 1 . . . N via the EPC 544a and cellular core network 544b.

Also shown is the access point 542 that is separate from the E-UTRAN 570a and cellular RAN 570b. The access point 542 may be connected to the Internet 546 independently from the EPC 544a and cellular core network 544b (e.g., via an optical communication system such as FiOS, a cable modem, etc.). The air interface 507 may serve UE 2, UE 4, and/or UE 5 over a local wireless connection, such as an IEEE 802.11 wireless connection in an example. The UE N is shown as a desktop computer with a wired connection to the Internet 546, such as a direct connection to a modem or router, which can correspond to the access point 542 in an example (e.g., for a Wi-Fi router with both wired and wireless connectivity).

The application server 550 is shown as connected to the Internet 546, the EPC 544a, and/or the cellular core network 544b. The application server 550 can be implemented as a plurality of structurally separate servers, or alternately may correspond to a single server. The application server 550 is configured to support one or more communication services (e.g., Voice-over-Internet Protocol (VoIP) sessions, Push-to-Talk (PTT) sessions, group communication sessions, social networking services, etc.) for UEs that can connect to the application server 550 via the EPC 544a, the cellular core network 544b, and/or the Internet 546.

Figure 5D:
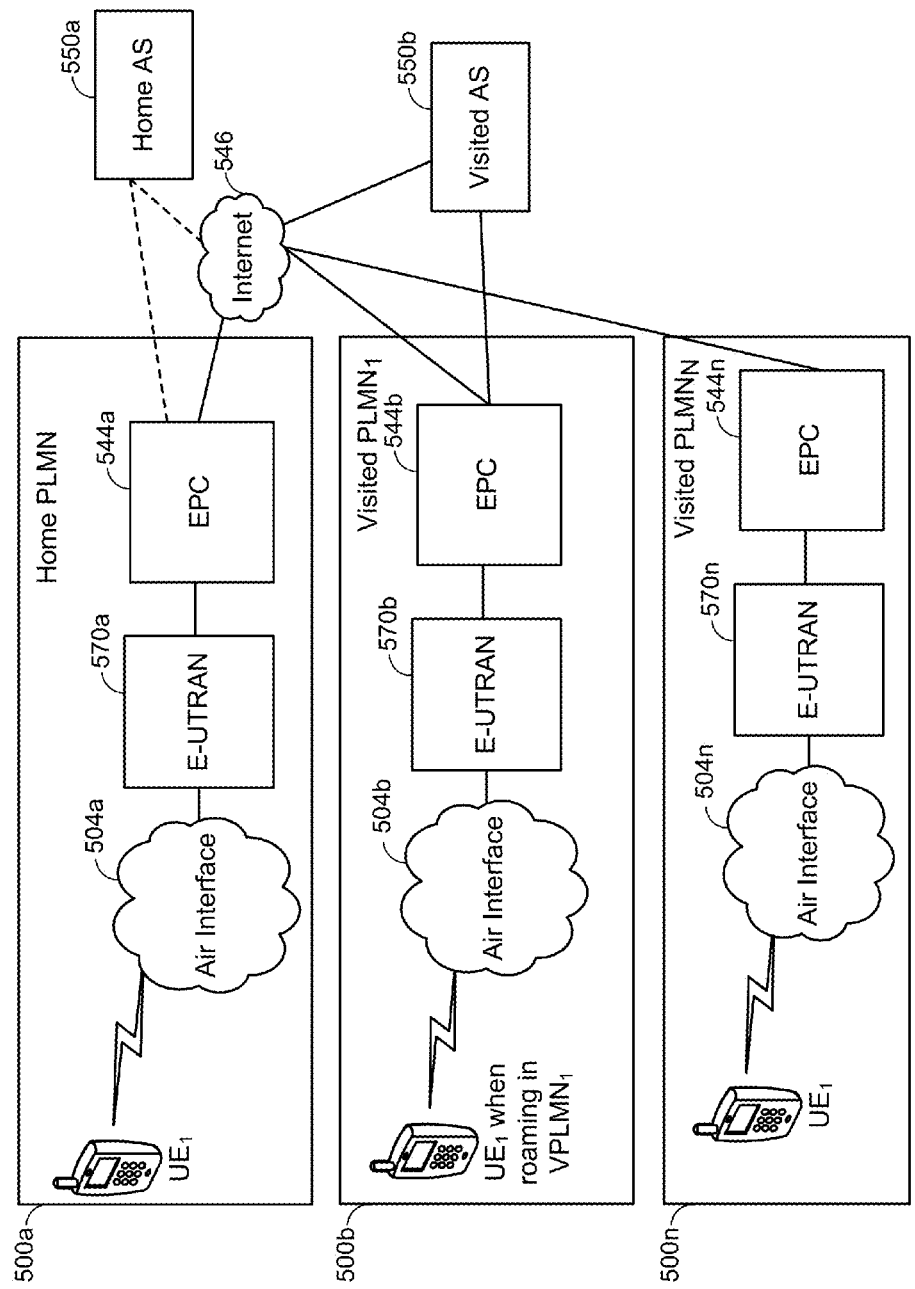

FIG. 5D illustrates another high-level system architecture of a wireless communications system that can support broadcast/multicast services, according to various embodiments. With reference to FIGS. 1-5D, the wireless communications system may include a Home Application Server 550a that provides service over eMBMS bearers to UEs in a Home PLMN 500a and one or more visited PLMNs (e.g., Visited PLMN$_1$ 500b, Visited PLMN$_N$ 500n, etc.). Visited PLMN$_1$ 500b may have a Visited Application Server 550b for the UEs that consider Home Application Server 550a their anchor registration server (i.e., subscriber information and group definitions associated with the UEs roaming in VPLMN$_1$ 500b primarily reside in Home Application Server 550a). The Visited Application Server 550b can retrieve information for UE$_1$ from the Home Application Server 550a when the UE$_1$ is roaming in VPLMN$_1$ 500b. However, VPLMN$_N$ 500n may not have a server that serves as a Visited Application Server for the services that the UE$_1$ roaming in VPLMN$_N$ 500n is interested in (e.g., PTT, VoIP, etc.), whereby and the UE$_1$ may always register with the Home Application server 550a while roaming in VPLMN$_N$ 500n that lacks a Visited Application Server.

As noted in the foregoing, eMBMS services can be used to distribute multicast data to groups and could be useful in group communication systems (e.g., PTT calls). Additionally, conventional systems can have unicast group communications, which can be used for the originator/talker 520 and or other UEs in the group (e.g., UEs that are not in an eMBMS service area or lose eMBMS coverage). Mixed casting can be used in some situations to switch between multicast and unicast during a group call. Mixed casting can use application layer signaling. For example, application layer signaling can be provided to switch to a unicast service without user intervention when multicast coverage drops while in call. This would result in increased unicast link usage and complexity on the client and the application server 550, but would increase the call availability. Additionally, to enable call reception at the beginning of the call on unicast links for a large group multicast call, application layer signaling can also be used. The application server can be used to maintain the state of the UE to determine whether the UE is to be serviced on unicast before the call set up to meet the performance criteria and to avoid any media clipping. This would also result in usage of additional unicast links for such targets.

Figure 6:
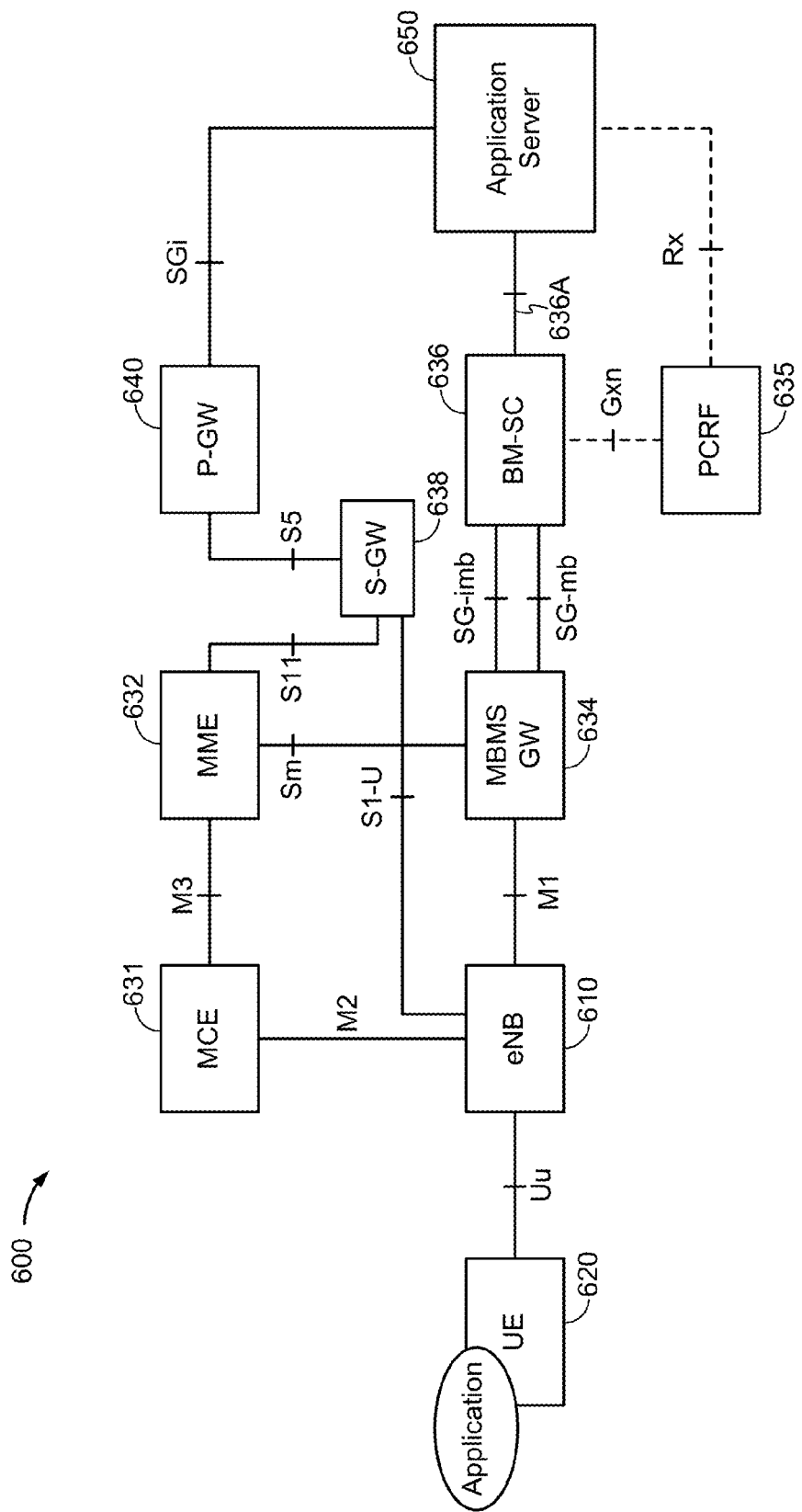
FIG. 6 illustrates an exemplary high-level system architecture that can support group communications using pre-established evolved multimedia broadcast/multicast (eMBMS) bearers in a home network according to various embodiments.

According to various embodiments, FIG. 6 illustrates an exemplary high-level system architecture 600 that can support group communications using pre-established evolved multimedia broadcast/multicast (eMBMS) bearers in a home network. In general, the architecture 600 may include various components that are identical or substantially similar to components that have been described in further detail above, particularly with reference to FIGS. 5A-5D. As such, for brevity and to simplify the description provided herein in relation to how seamless and resource efficient roaming may be provided for group call services on broadcast/multicast networks, various details relating to certain components, functionality, or other characteristics associated with the architecture 600 may be omitted herein to the extent that the same or similar details have already been provided above.

Referring to FIGS. 1-6, the architecture 600 may generally enable group communication services using pre-established eMBMS bearers in a Home Public Land Mobile Network (HPLMN) or other suitable home network. More particularly, group communication services that are supported under the architecture 600 may generally use eMBMS bearers on a downlink and unicast bearers on an uplink. However, in certain cases (e.g., when the HPLMN does not support eMBMS service), unicast bearers may be used on the downlink. Furthermore, the architecture 600 may use pre-established eMBMS bearers to quickly setup group communications and use a Policy Charging Rules Function (PCRF) 635 as an interface between an application server 650 (e.g., application server 550) and BM-SC 636 (e.g., BM-SC 536) to exchange eMBMS-related control information within the HPLMN. For reference, network interfaces between the various components shown in FIG. 6 and the various components shown in FIGS. 8A-8E (which will be described in further detail below) are defined in Table 3 (below).

TABLE 3

| Interface | Description |
|---|---|
| ProSe | Interface between two or more UEs in proximity that are Proximity Services (ProSe)-enabled and can communicate via a path that does not traverse any network node through user plane transmissions that use E-UTRAN technology. |
| Uu | Interface that links a UE to a RAN in a UMTS network. |
| M1 | Interface between an eNB and an EPC for MBMS data delivery, which provides an interconnection point between the E-UTRAN and the EPC. Also considered a reference point and a user plane interface between E-UTRAN and EPC. |
| M2 | E-UTRAN Internal control plane interface between an eNB and an MCE. Also considered a reference point. |
| M3 | Control plane interface between an E-UTRAN MCE and MME. Also considered a reference point. |
| S1-U | Reference point between RAN and S-GW for the per bearer user plane tunneling and inter-eNodeB path switching during handover. |
| Sm | Interface between MME and MBMS-GW, which may be used to transfer MBMS service control messages and IP multicast addresses for MBMS data. |
| S5 | Provides user plane tunneling and tunnel management between S-GW and P-GW, and may be used for S-GW relocation due to UE mobility and/or if the S-GW needs |

TABLE 3-continued

| Interface | Description |
|---|---|
| | to connect to a non-collocated P-GW for the required PDN connectivity. |
| S8 | Inter-PLMN reference point providing user and control plane between the S-GW in a Visited Public Land Mobile Network (VPLMN) and the P-GW in a Home Public Land Mobile Network (HPLMN). S8 is the inter-PLMN variant of S5. |
| S9 | Provides transfer of QoS policy and charging rules between a Home PCRF and a Visited PCRF to support local breakout. |
| S11 | Reference point between MME and S-GW. |
| SGi | Reference point between the P-GW and the packet data network (e.g., the Internet). The Packet data network may be an operator external public or private packet data network or an intra-operator packet data network (e.g., for provision of IMS services). This reference point corresponds to Gi for 3GPP accesses. |
| SG-imb | Reference point between BM-SC and MBMS GW for MBMS data delivery. |
| SG-mb | Reference point for the control plane between BM-SC and MBMS GW. |
| Gxn | Proposed interface in 3GPP TR 23.768 to provide transfer of Quality of Service (QoS) policy and charging rules from PCRF to BM-SC and management of eMBMS bearers via the application server. |
| Rx | Reference point between the PCRF and an application function (AF) that is used to exchange application-level session information, where the AF is represented herein by the application server. |

Referring again to FIGS. 1-6, which generally illustrates a non-roaming scenario within a particular HPLMN, the architecture 600 includes a single PCRF 635 in the HPLMN associated with an Internet Protocol Connectivity Access Network (IP-CAN) session for a particular UE (e.g., UE 620), wherein the PCRF 635 may terminate the Rx interface and the Gxn interface. Accordingly, FIG. 7 illustrates an exemplary call flow that can be used (e.g., in the architecture 600) to support group communications using pre-established eMBMS bearers in an HPLMN or other home network that uses the PCRF 635 as an interface between the application server 650 and the BM-SC 636.

For example, with reference to FIGS. 1-7, the application server 650 in the HPLMN may initially request a temporary mobile group identity (TMGI) or other suitable identifier associated with a group in the HPLMN from the PCRF 635 over the Rx interface at call flow 705, wherein the PCRF 635 may then similarly request the TMGI or other suitable network group identifier from the BM-SC 636 over the Gxn interface at call flow 710. The BM-SC 636 may then reserve the requested TMGI and provide information relating to the reserved TMGI to the PCRF 635 at call flow 715, and the PCRF 635 may relay the information relating to the reserved TMGI to the application server 650 at call flow 720. In various embodiments, the application server 650 may then maintain a TMGI to group identifier mapping and request one or more eMBMS bearers from the PCRF 635 at call flow 725. The PCRF 635 may then communicate with the BM-SC 636 to establish the eMBMS bearers to support group communication in the MBSFN area at call flow 730. For example, at call flow 735, the BM-SC 636 may communicate with an evolved UMTS Terrestrial RAN (E-UTRAN) 670 to establish the eMBMS bearers for the corresponding MBSFN area, which may be based on the eNBs 610 that were pre-selected for the group communications and provided to the BM-SC 636. In response to receiving an indication from the E-UTRAN 670 that the eMBMS bearers have been established, the BM-SC 636 may notify the PCRF 635 that the eMBMS bearers have been established at call flow 740, and the PCRF 635 may then provide a bearer response message to the application server 650 at call flow 745. Alternatively, the application server 650 may directly interface with the BM-SC 636 via a dedicated interface (e.g., interface 636A as shown in FIG. 6) to reserve the TMGI, to activate the bearer, to receive a response from the BM-SC 636, and to manage any other eMBMS bearer related functions.

In various embodiments, at some subsequent point in time, an application executing on the UE 620 may communicate with the application server at call flow 750 to register for group communication service. For example, in various embodiments, the registration message transmitted from the UE 620 to the application server 650 at call flow 750 may include the group identifiers in which the UE 620 has interest. If available, the application server 650 may then return the TMGI(s) associated with the groups in which the UE 620 has registered interest at call flow 755, and the UE 620 may then maintain an appropriate mapping between the TMGI(s) returned from the application server 650 and the group identifiers in which the UE 620 has registered interest. Alternatively, the application server 650 may deliver the TMGI(s) for the groups of interest to the UE 620 in an out of band signaling. When the UE 620 wants to set up a group communication, the UE 620 may transmit a group communication setup message to the application server 650 at call flow 760. For example, the UE 620 may generally monitor the network to determine the availability of the eMBMS transmission corresponding to the TMGI(s) mapped to the group(s) in which the UE 620 has registered interest and initiate the group communication setup for a particular group at call flow 760 using unicast uplink bearers. Furthermore, at call flow 760, the UE 620 may indicate the availability of the eMBMS transmission that corresponds to the TMGI in group setup signaling.

Accordingly, in response to receiving the group communication setup message, the application server 650 may then decide whether to use the pre-established eMBMS bearers for the downlink. In particular, at call flow 765, the application server 650 may send group communication traffic to the UE 620 over the pre-established eMBMS bearers if the application server 650 decides to use the pre-established eMBMS bearers for the downlink. In other cases, the application server 650 may use point-to-point service or point-to-multipoint service to send the downlink transmissions associated with the group call to further optimize resource utilization (e.g., based on counting information) and/or send one or more downlink transmissions associated with the group call over unicast downlink bearers (e.g., to any group members that may be located outside the MBSFN area).

As noted above, the architecture 600 is a non-roaming architecture includes a single PCRF 635 in the HPLMN. However, as will be described in further detail herein with reference to FIGS. 8A-8E, which generally illustrate various roaming scenarios that may include home-routed traffic and/or local breakout traffic, there may be two PCRFs associated with an IP-CAN session and eMBMS bearer management for a particular UE 820, namely a Home PCRF 835a that resides within a HPLMN 800a, and a Visited PCRF 835b that resides within a Visited PLMN (VPLMN) 800b. As will be described in further detail herein, the roaming scenarios shown in FIGS. 8A-8E may service one or more UEs 820b in the VPLMN 800b on a unicast transport service or a combination of a unicast transport service and a multicast transport service until the service switch from the HPLMN 800a to the VPLMN 800b occurs.

Figure 8A:
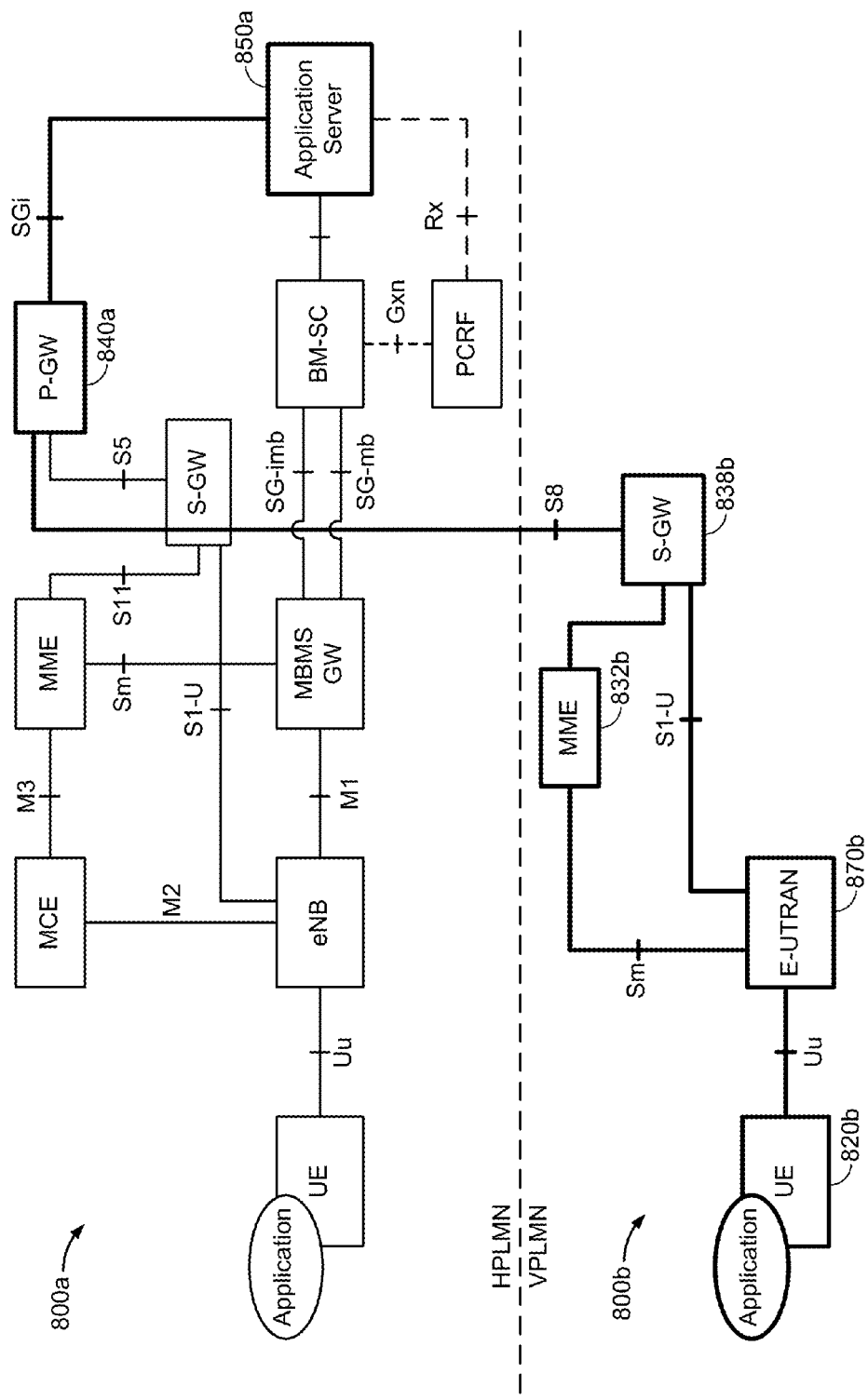
FIGS. 8A-8E illustrate exemplary high-level system architectures that can support group communications using a unicast transport service and/or eMBMS bearers in roaming networks according to various embodiments.
Figure 8B:
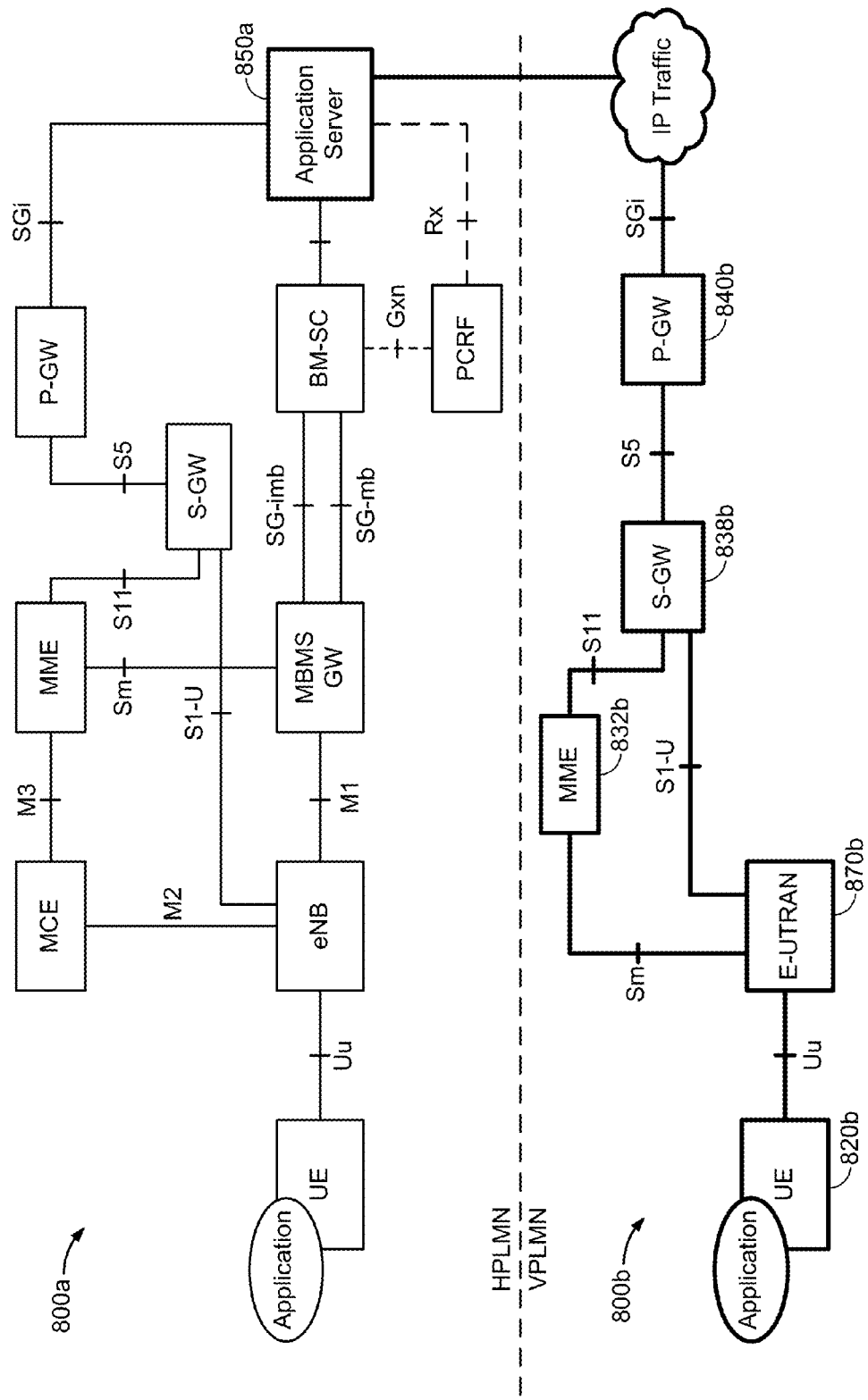

More particularly, FIG. 8A shows a roaming scenario that uses unicast transport service to service a roaming UE 820b in the VPLMN 800b for home-routed traffic (e.g., traffic that terminates in the HPLMN 800a) when eMBMS service is unavailable in the VPLMN 800b, and FIG. 8B shows a roaming scenario that uses unicast transport service to service a roaming UE 820b in the VPLMN 800b for local breakout traffic (e.g., traffic that terminates in the VPLMN 800b) when eMBMS service is unavailable in the VPLMN 800b. For example, referring to FIGS. 1-8A, when a roaming UE 820b moves from the HPLMN 800a to the VPLMN 800b, the roaming UE 820b may get a unicast bearer that terminates in the HPLMN 800a (e.g., from a Visited S-GW 838b to a Home P-GW 840a), wherein the unicast bearer may be established via a Home AS 850a communicating with the Home P-GW 840a. Alternatively, in FIG. 8B, none of the components in the LTE infrastructure in HPLMN 800a may be used (except for possibly the Home PCRF 835a for back-door policy checking). In this case, the roaming UE 820b may have all group communication traffic terminated at the VPLMN 800b via the SGi interface that provides the reference point between the Visited P-GW 840b and a packet data network (e.g., the Internet). As such, the Home AS 850a may send downlink traffic to the roaming UE 820b via normal IP routing.

Figure 8C:
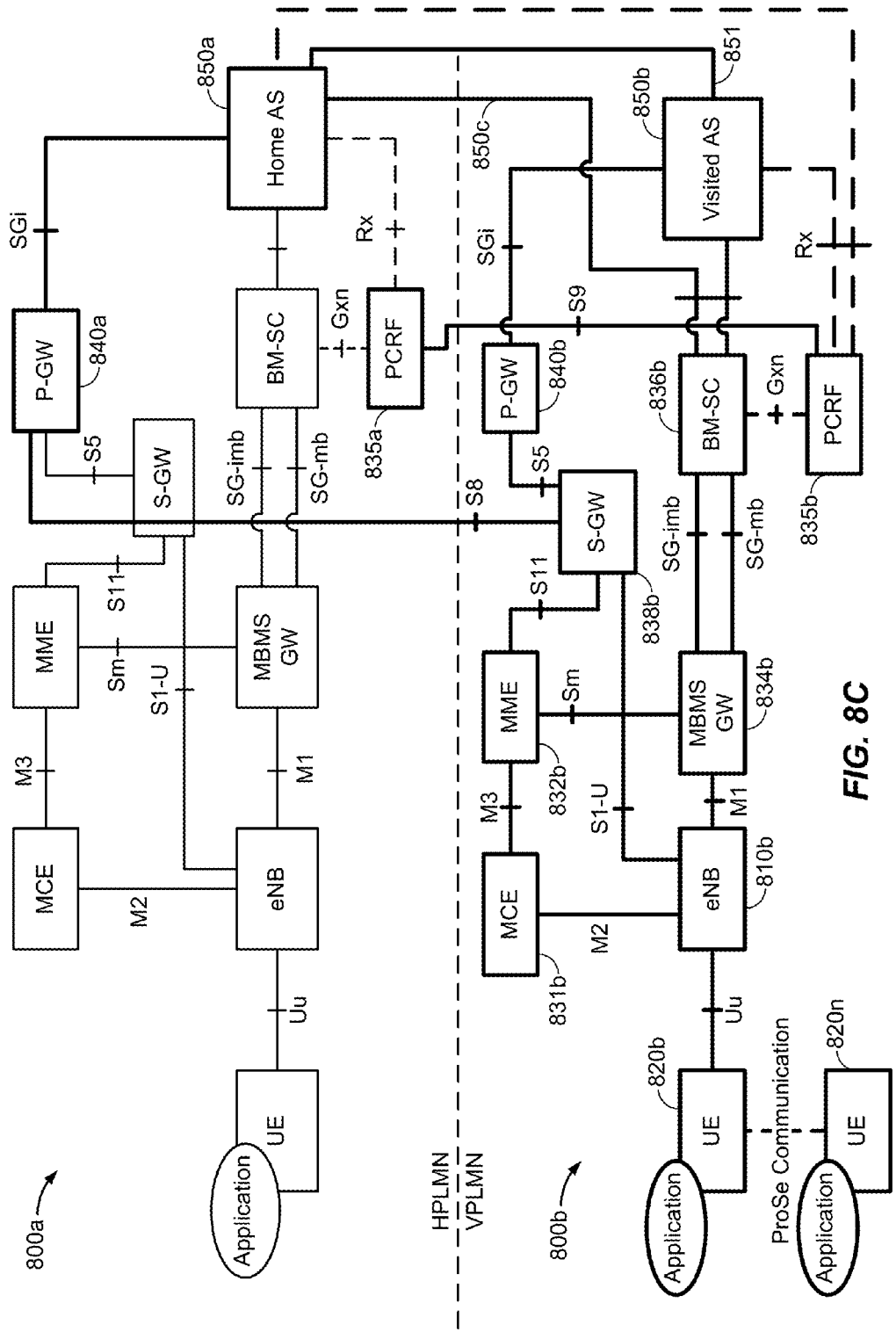
Figure 8D:
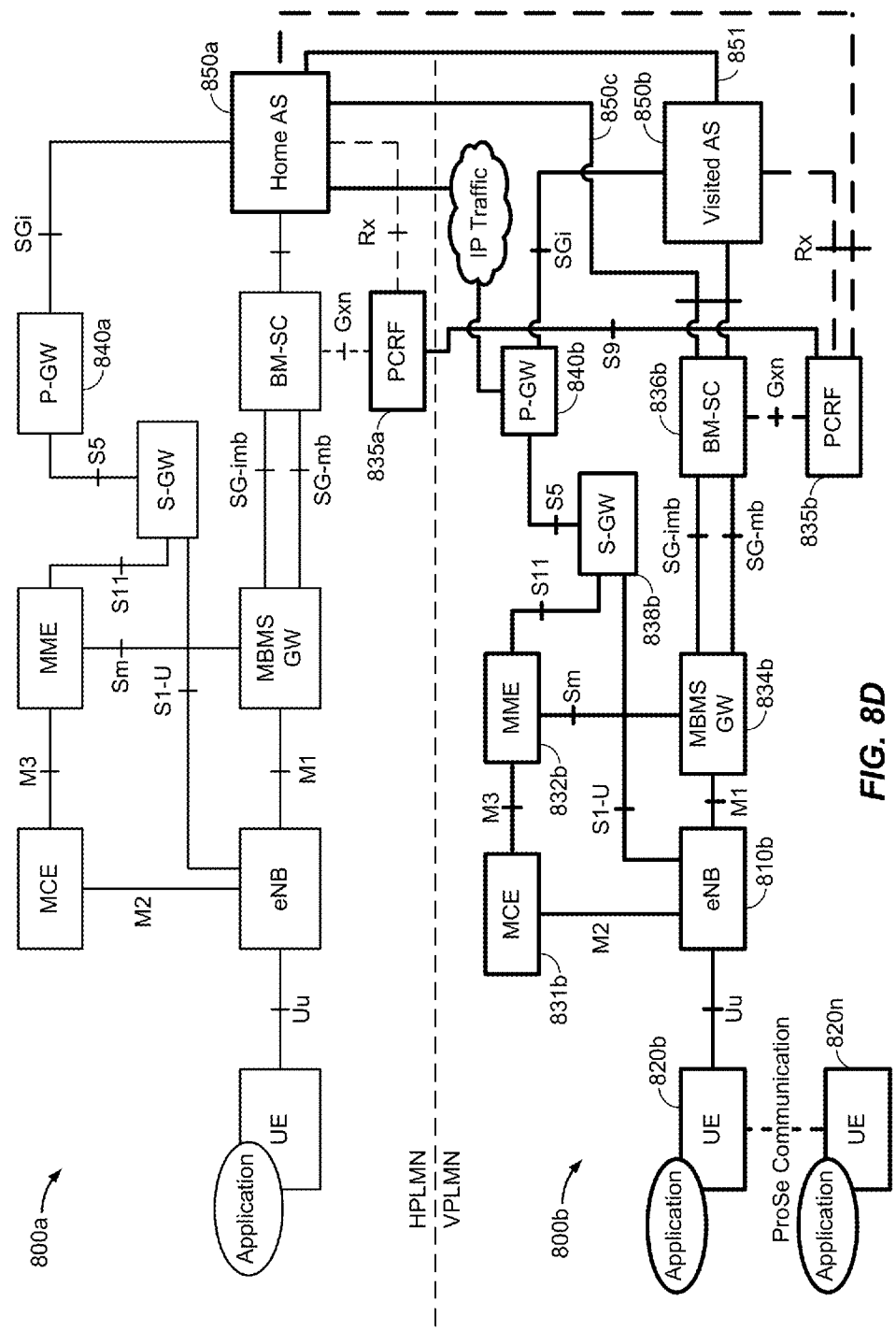

Referring now to FIGS. 1-8D, roaming scenarios in which eMBMS service is available in the VPLMN 800b are shown in FIGS. 8C-8D, wherein the roaming scenarios shown therein may be substantially similar except that FIG. 8C shows a roaming scenario that has home-routed unicast traffic (e.g., exchanged via the S8 interface between the Visited S-GW 838b and the Home P-GW 840a) and FIG. 8D shows a roaming scenario that has local breakout unicast traffic terminated in the VPLMN 800b via the Visited P-GW 840b. Accordingly, when the roaming UE 820b moves to the VPLMN 800b, the roaming UE 820b terminates unicast traffic in the VPLMN 800b (e.g., at the Visited P-GW 840b and/or the Visited BM-SC 836b, which then appropriately route the unicast traffic to components located in the HPLMN 800a). In this context, the Home AS 850a may assist the roaming UE 820b in establishing eMBMS bearers in the VPLMN 800b or otherwise passing information associated with eMBMS bearers established in the VPLMN 800b to the roaming UE 820b. Furthermore, the Visited PCRF 835b may communicate with the Home PCRF 835a via the S9 interface and thereby enable the Home AS 850a to establish eMBMS bearers through the Visited AS 850b. The Visited PCRF 835b may be involved in performing policy checks for unicast bearer information per existing 3GPP specifications. Alternatively, the Home AS 850a can directly communicate with the Visited BM-SC 836b over a direct interface 850c to manage the eMBMS bearer in the VPLMN 800b, as explained (e.g., with respect to FIG. 6). In a further alternative, in the event that the Home AS 850a does not have direct access to the Visited BM-SC 836b, the Home AS 850a may communicate with the Visited BM-SC 836 via the Visited AS 850b using a direct interface 851 between the Home AS 850a and Visited AS 850b, as shown in FIGS. 8C-8D.

Referring now to FIGS. 1-8E, a roaming scenario in which eMBMS service is available in the VPLMN 800b and the Home AS 850a is not used for communication is shown. In particular, where eMBMS service is available in the VPLMN 800b and the Home AS 850a is not used for communication, the service may be supported over unicast only or a combination of unicast and multicast services. As such, the roaming scenario shown in FIG. 8E may generally operate in a similar manner to when the UE 820 is in the HPLMN 800a, except that the Visited AS 850b may be used for signaling and some services may be limited depending on capabilities of the Visited AS 850b.

Figure 8E:
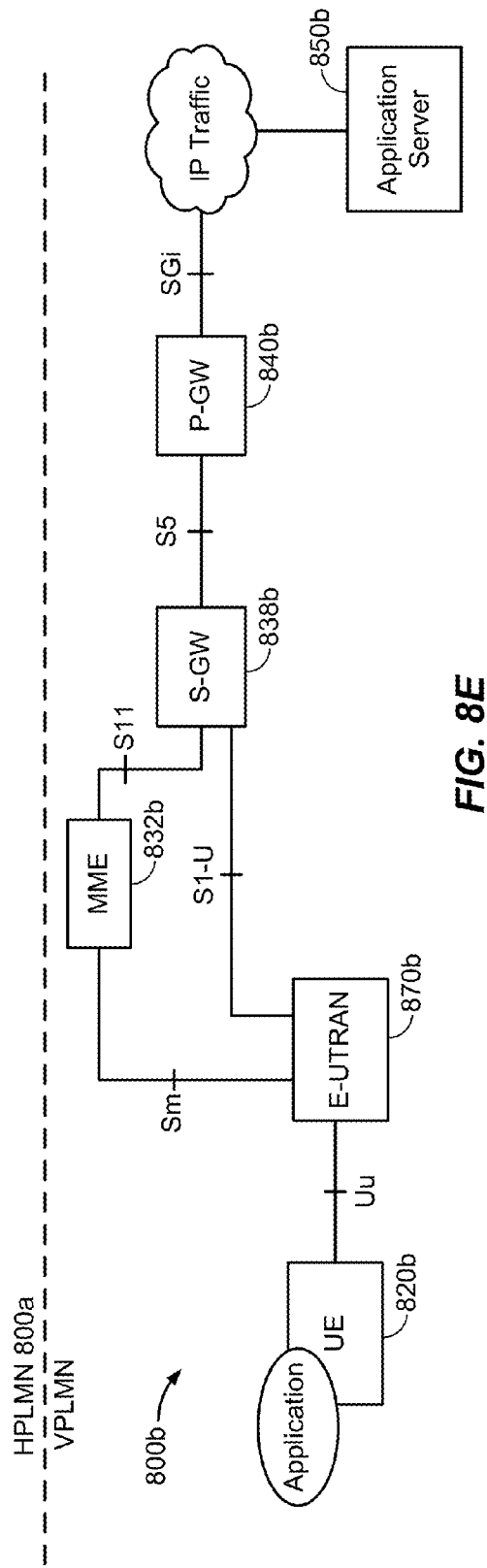
Figure 9A:
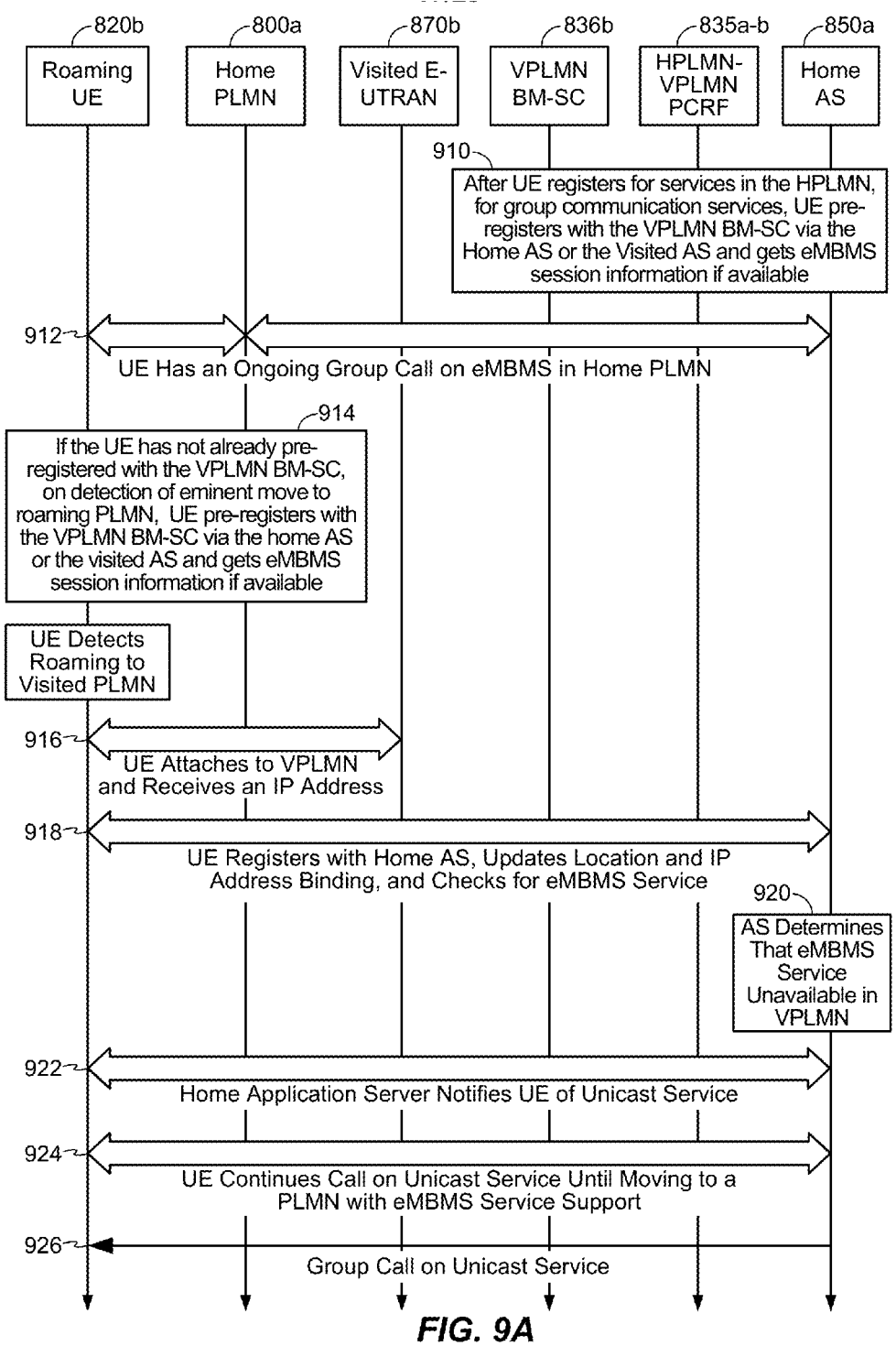
FIGS. 9A-9E illustrate exemplary call flows to support group communications using a unicast transport service and/or eMBMS bearers in roaming networks according to various embodiments.

According to various embodiments, FIG. 9A shows an exemplary call flow in a roaming scenario that uses unicast transport service to service a roaming UE 820b in a VPLMN 800b when eMBMS service is unavailable in the VPLMN 800b (e.g., the roaming scenarios shown and described in further detail above with reference to FIGS. 8A, 8B, and 8E). More particularly, with reference to FIGS. 1-9, the UE 820b may pre-register with the Visited AS 850b for group communication services at 910 after registering with the Home AS 850a for services in the HPLMN 800a. The pre-registration can be facilitated via the direct interface 851 from the Home AS 850a to the Visited AS 850b, as shown in FIGS. 8C-8D, or the UE 820b may directly detect an IP address associated with the Visited AS 850b and communicate with the Visited AS 850b for pre-registration. During the pre-registration, the UE 820b may receive information of the eMBMS bearer context. To reduce service disruption while roaming, the HPLMN 800a and the VPLMN 800b can have a service agreement to allow for LTE pre-registration and authentication checks for the VPLMN 800b from the HPLMN 800a. At call flow 912, the UE 820b may have an ongoing group call on an eMBMS bearer in the HPLMN 800a, which communicates with the Home AS 850a. At some point the UE 820b may estimate that an imminent transfer to the VPLMN 800b is possible. At 914, if the UE 820b has not already pre-registered with the VPLMN BM-SC 836b at the time that the imminent move to the VPLMN 800b is detected, the UE 820b may pre-register with the VPLMN BM-SC 836b via the Home AS 850a or the Visited AS 850b and get eMBMS session information if available. At some point in time, the UE 820b detects roaming to the VPLMN 800b and then attaches to a Visited E-UTRAN 870b associated with the VPLMN 800b and receives an IP address assigned thereto from the Visited E-UTRAN 870b at call flow 916.

The roaming UE 820b may then update the registration with the Home AS 850a (depending on a call state associated with the UE 820b), provide the Home AS 850a with an updated location, network information, and IP address binding (e.g., based on the IP address assigned by the Visited E-UTRAN 870b), and check for eMBMS service in the VPLMN 800b at call flow 918. At call flow 920, the Home AS 850a may then check for eMBMS service in the VPLMN 800b based on a provisioned mapping for eMBMS services in VPLMNs and determine that eMBMS service is unavailable in the VPLMN 800b. As such, at call flow 922, the Home AS 850a may notify the roaming UE 820b that unicast service will be used for downlink traffic, and the roaming UE 820b may then continue the group call on unicast service at call flow 924 until moving to a PLMN that supports eMBMS service (e.g., the HPLMN 800a or a different VPLMN 800b that supports eMBMS service). Accordingly, the group call may then be terminated at the roaming UE 820b on unicast service at call flow 926.

Figure 9B:
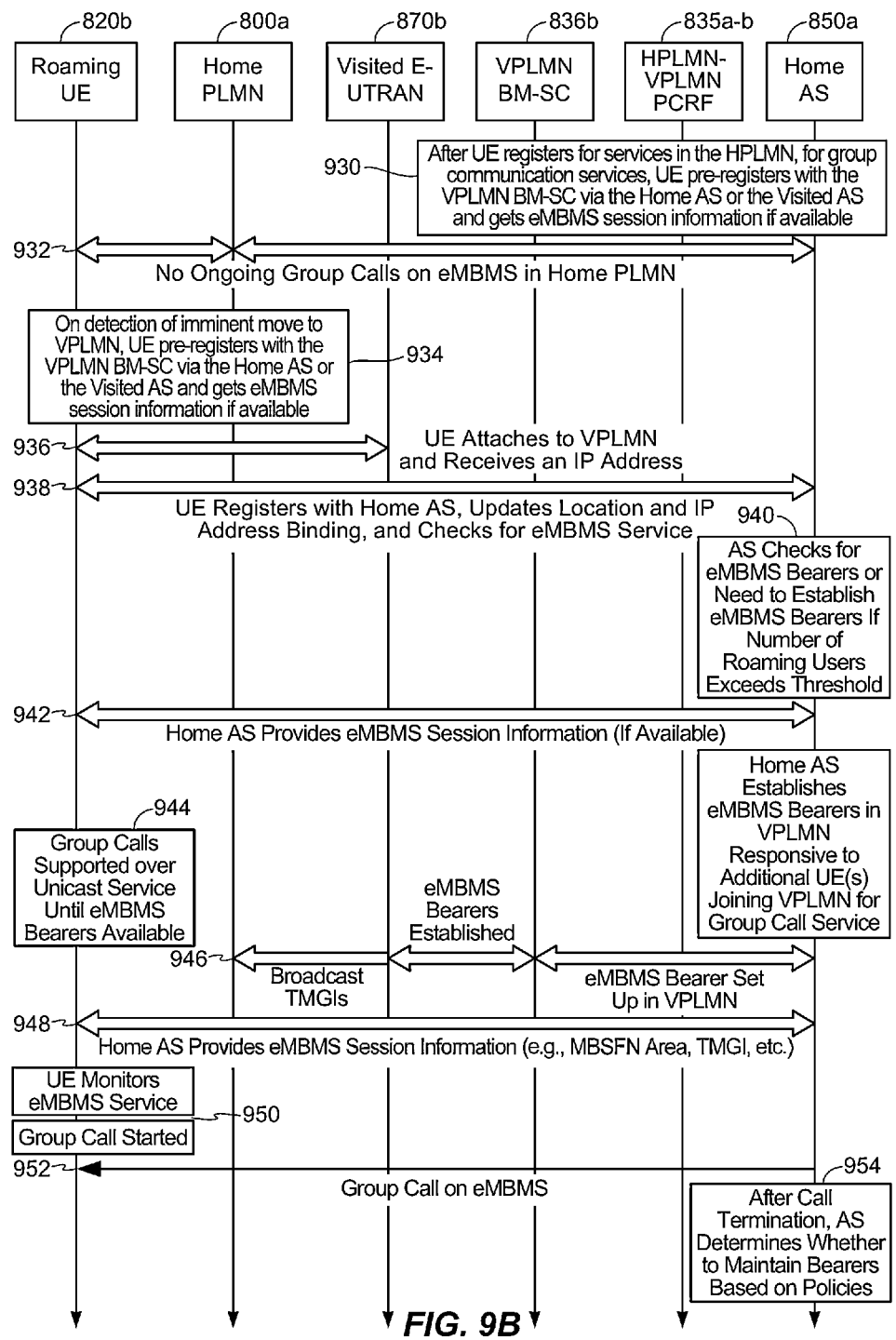

According to various embodiments, FIG. 9B shows an exemplary call flow in a roaming scenario that uses unicast and/or multicast service to service a roaming UE 820b in a VPLMN 800b until appropriate eMBMS bearers are available when eMBMS service is available in the VPLMN 800b. More particularly, with reference to FIGS. 1-9B, at call flow 930 and after registering with the Home AS 850a for services in the HPLMN 800a, the UE 820b may pre-register with the Visited AS 850b for group communication services. The pre-registration can be facilitated via the direct interface 851 from the Home AS 850a to the Visited AS 850b, as shown in FIGS. 8C-8D, or the UE 820b may directly detect an IP address associated with the Visited AS 850b and communicate with the Visited AS 850b for pre-registration. During the pre-registration, the UE 820b may receive information of the eMBMS bearer context. At call flow 932, the UE 820b may initially have no ongoing group calls on eMBMS bearers in the HPLMN 800a. At 934, if the UE 820b has not already pre-registered with the VPLMN BM-SC 836b, the UE 820b may pre-register with the VPLMN BM-SC 836b via the Home AS 850a or the Visited AS 850b upon detecting an imminent move to the VPLMN 800b and gets eMBMS session information if available. At some point in time, the UE 820b may attach to the VPLMN 800b and receive an IP address from the Visited E-UTRAN 870b at call flow 936. The roaming UE 820b may then register with the Home AS 850a or the Visited AS 850b depending on the applicable roaming configuration (e.g., as in FIGS. 8A-8E), update a location and IP address binding associated therewith (e.g., based on the IP address assigned by the Visited E-UTRAN 870b), and check for eMBMS service in the VPLMN 800b at call flow 938.

At call flow 940, the Home AS 850a may check for eMBMS service in the VPLMN 800b and determine that eMBMS service is available in the VPLMN 800b. Further, in response to that eMBMS service is available in the VPLMN 800b, the Home AS 850a may determine a need to establish eMBMS bearers in the VPLMN 800b at call flow 940 only if the number of roaming users serviced in the VPLMN 800b for the particular group mapped on the eMBMS bearer exceeds a suitable threshold (e.g., to reduce overhead associated with communicating and setting up a MBSFN with components in the VPLMN 800b to service a small number of users where unicast service would be more resource efficient as compared to multicast).

In various embodiments, if the Home AS 850a determines that eMBMS service is available in the VPLMN 800b and the number of roaming users serviced in the VPLMN 800b for a group that uses an MTCH on the eMBMS bearer exceeds the threshold, the Home AS 850a may then provide the roaming UE 820b with eMBMS session information at call flow 942. Subsequently, at call flow 944, group calls may be supported over unicast and/or multicast service until the eMBMS bearers are available when the Home AS 850a determines that one or more additional UEs 820b have joined the VPLMN 800b and registered for group communication service, thereby prompting the Home AS 850a to establish the eMBMS bearers in the VPLMN 800b. In response thereto, at call flow 946, the Home AS 850a may communicate with the Visited BM-SC 836b to establish eMBMS bearers in the VPLMN 800b, wherein the Visited BM-SC 836b may communicate with the Visited E-UTRAN 870b to establish the eMBMS bearers and the Visited E-UTRAN 870b may in turn broadcast the TMGI(s) associated therewith to the HPLMN 800a.

The Home AS 850a may then provide the eMBMS session information (e.g., MBSFN area, TMGI(s), etc.) to the roaming UE 820b at call flow 948. The roaming UE 820b may then monitor the network to determine the availability of the eMBMS service and start the group call once available at call flow 950. Accordingly, traffic associated with the group call may then be terminated at the roaming UE 820b on the available eMBMS bearers at call flow 952. After the call has terminated, at call flow 954, the Home AS 850a may then determine whether to maintain the eMBMS bearers that were established in the VPLMN 800b or deactivate the eMBMS bearers based on one or more appropriate policies (e.g., the number of roaming users in the VPLMN 800b, call activity, etc.).

Figure 9C:
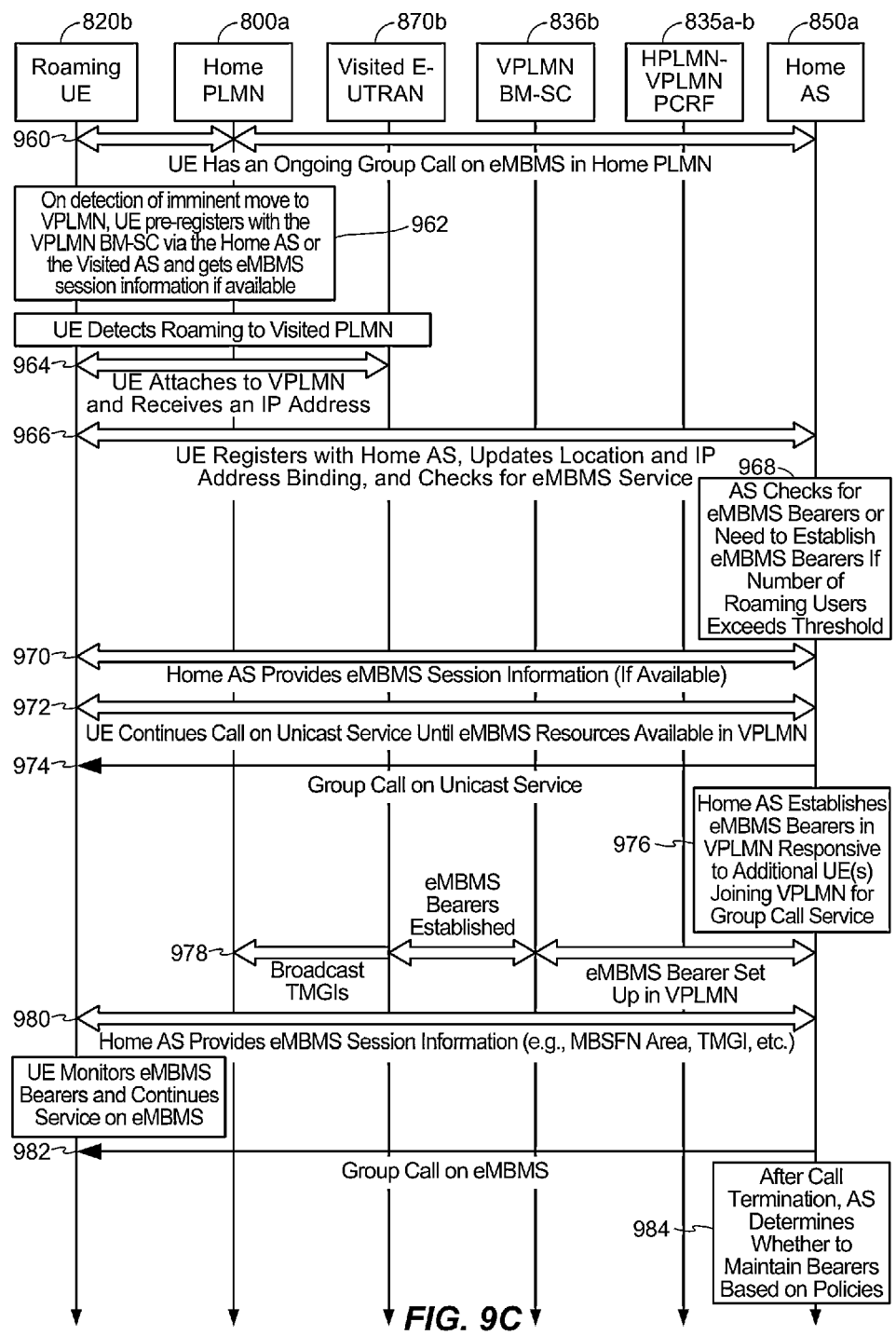

According to various embodiments, FIG. 9C shows another exemplary call flow in a roaming scenario that uses unicast and/or multicast service to service a roaming UE 820b in a VPLMN 800b until appropriate eMBMS bearers are available when eMBMS service is available in the VPLMN 800b. In general, the call flow shown in FIG. 9C may be substantially similar to the call flow shown in FIG. 9B except that the roaming UE 820b may initially have an ongoing group call on an eMBMS bearer in the HPLMN 800a at call flow 960. Thus, with reference to FIGS. 1-9C, the roaming UE 820b may therefore receive traffic associated with the ongoing group call on unicast service at call flow 974 until the eMBMS bearers are made available due to the Home AS 850a determining that one or more additional UEs 820b have joined the VPLMN 800b and registered for group communication service, thereby prompting the Home AS 850a to establish the eMBMS bearers in the VPLMN 800b. As such, in response to receiving the eMBMS session information from the Home AS 850a at call flow 980, the roaming UE 820b may monitor the network to determine the availability of the eMBMS bearers and continue the group call on the eMBMS bearers at call flow 982 once the eMBMS bearers have been established and made available in the VPLMN 800b. Otherwise, the call flows shown in FIG. 9C may be substantially similar or identical to those shown in FIGS. 9A and/or 9B and will not be described in further detail herein for brevity.

Figure 9D:
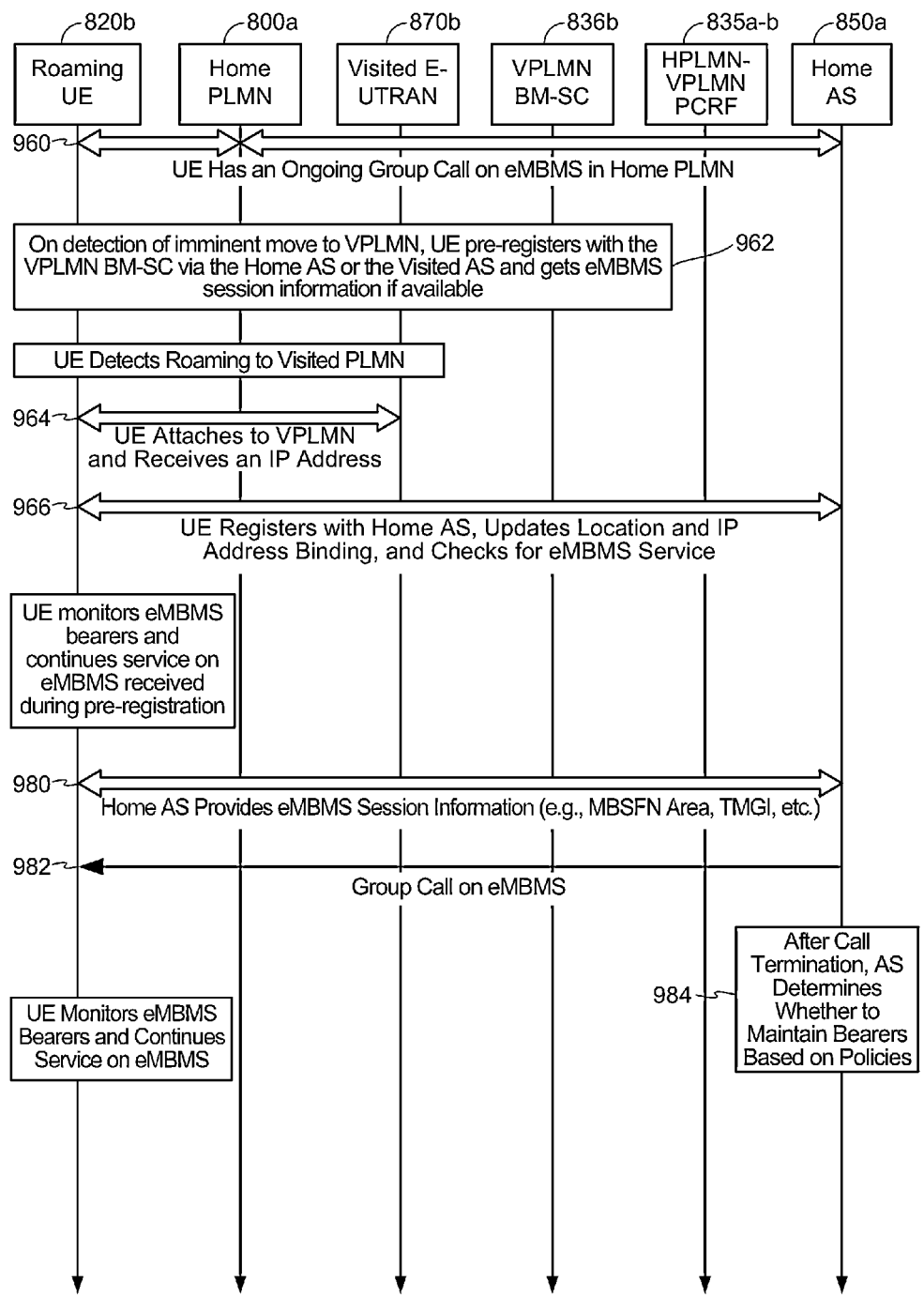
Figure 9E:
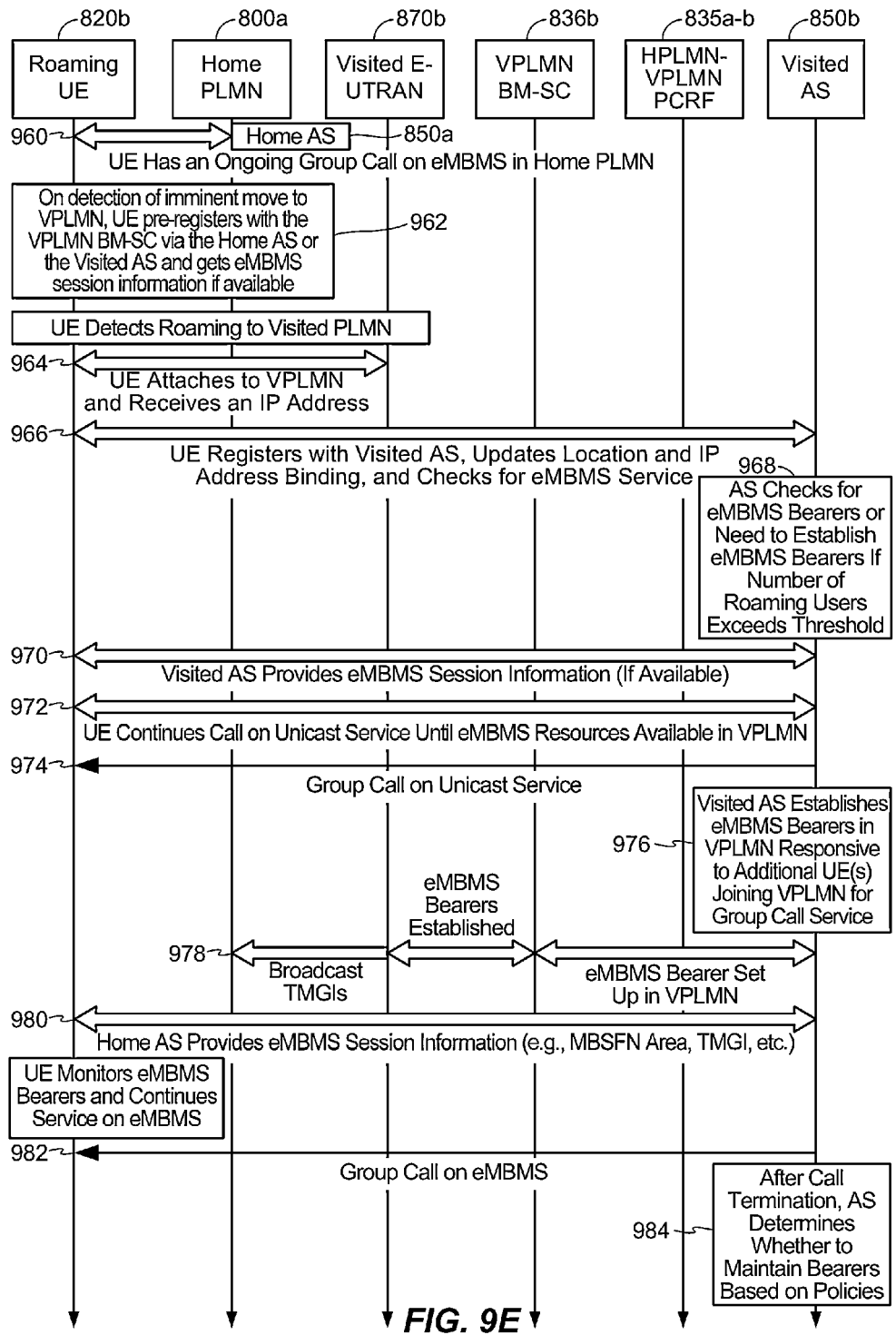

According to various embodiments, FIG. 9D shows an additional exemplary call flow in a roaming scenario that uses multicast service to service a roaming UE 820b in a VPLMN 800b when eMBMS service is available in the VPLMN 800b. Referring to FIGS. 1-9D, the UE 820b may already have the eMBMS bearer information as a result of pre-registration and can therefore tune into the eMBMS bearers faster and thereby reduce service interruption time between switching from an eMBMS bearer in the HPLMN 800a to the VPLMN 800b. In addition, to further reduce the bearer switching time, the HPLMN 800a and the VPLMN 800b operators may allow for LTE pre-registration and authentication, which may occur upon the UE 820b detecting an imminent move to the VPLMN 800b at 962, or alternatively through the Visited BM-SC 836b via the Home AS 850a or the Visited AS 850b, as shown at 910 and 930. Accordingly, relative to the call flow in FIG. 9C, the UE 820b may monitor eMBMS bearers and continue service on eMBMS bearers using the eMBMS bearer information received during pre-registration rather than continuing the ongoing group call on unicast service until eMBMS resources have been made available in the VPLMN 800b. Alternatively, referring to FIGS. 1-9E, the UE 820b may continue an ongoing group call on unicast service until the eMBMS resources have been made available in the VPLMN 800b, wherein the call flows shown in FIG. 9C and FIG. 9E may be substantially similar except that the Visited AS 850b handles the signaling rather than the Home AS 850a.

Figure 10A:
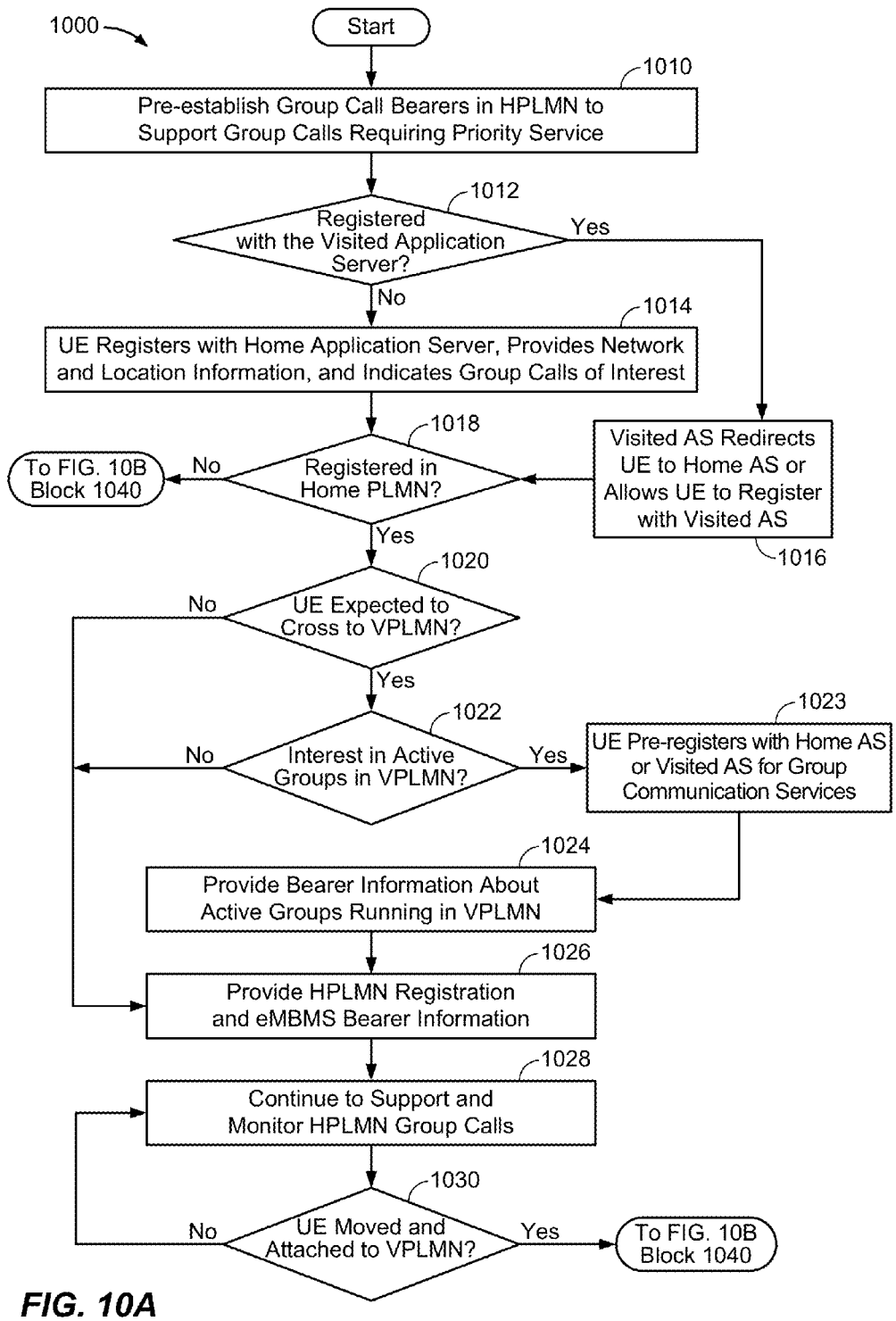
FIGS. 10A-10C illustrate an exemplary method to support group communications using a unicast transport service and/or eMBMS bearers in roaming networks according to various embodiments.
Figure 10B:
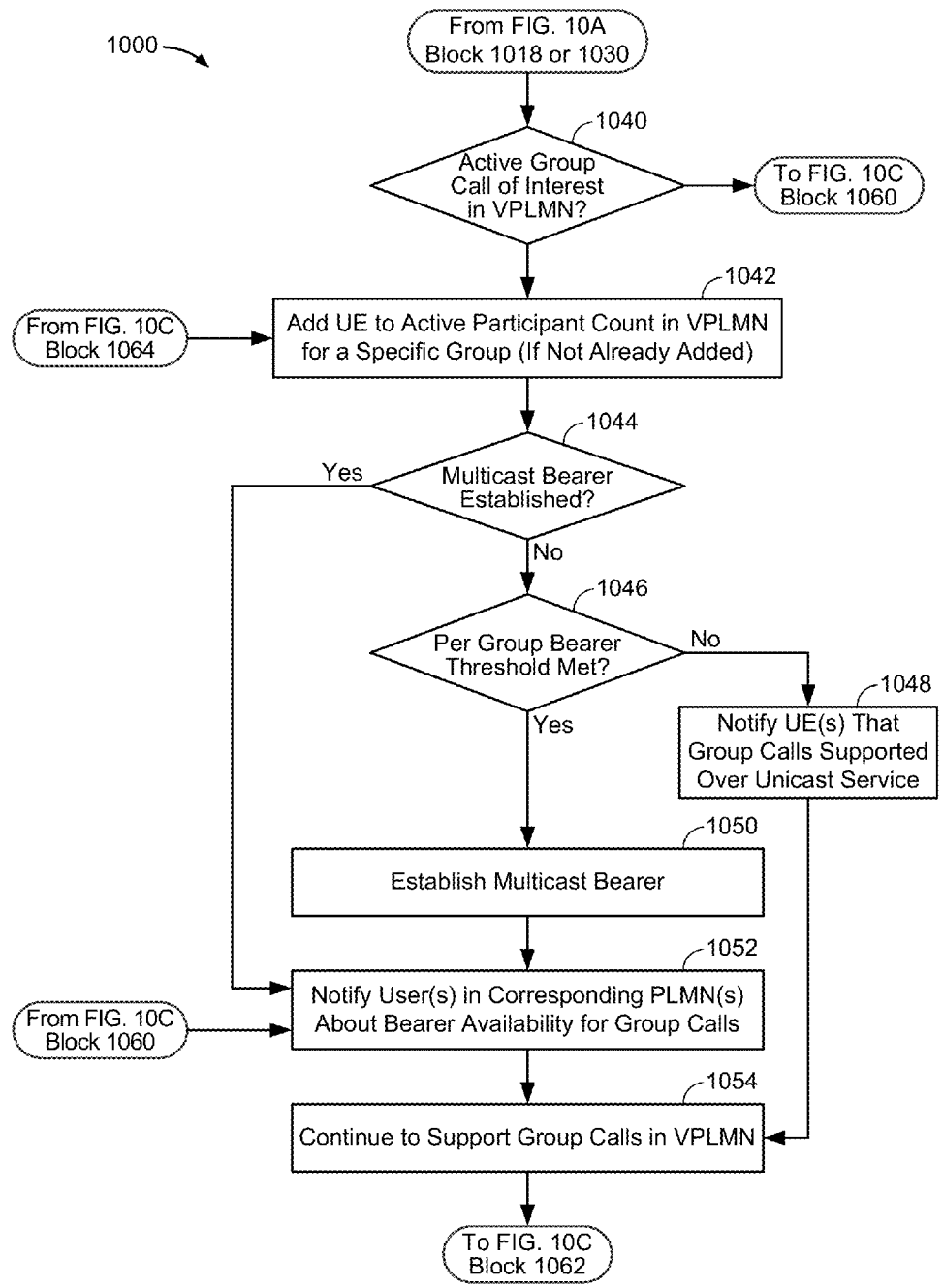
Figure 10C:
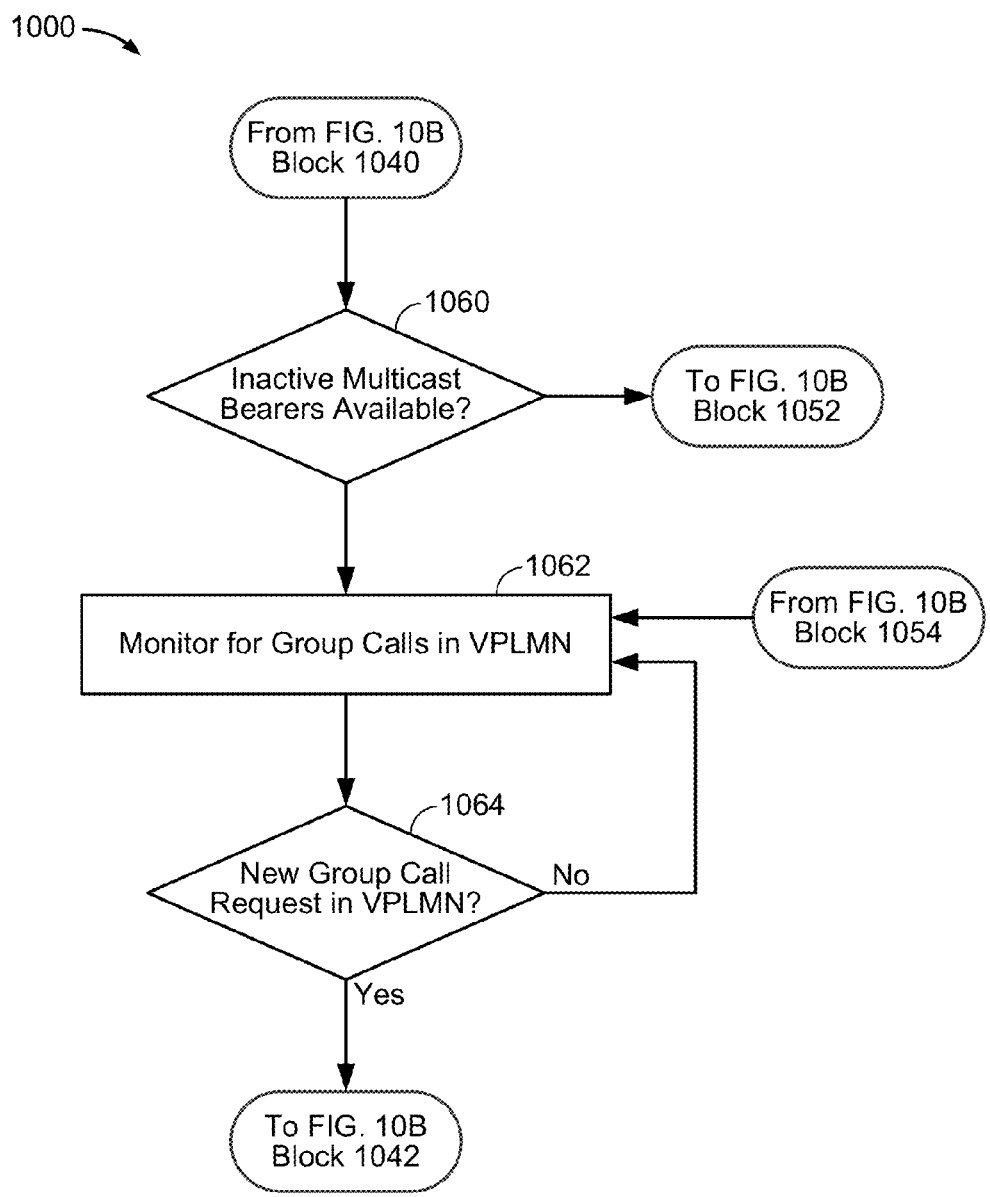

According to various embodiments, FIGS. 10A-10C illustrate an exemplary method 1000 that represents an overall call flow to support group communications for a UE that roams from a Home PLMN (HPLMN) that supports eMBMS service to a Visited PLMN (VPLMN) that may or may not support eMBMS service. In particular, as will be described in further detail herein, FIG. 10A generally illustrates various operations that may be performed locally within the HPLMN, FIG. 10B generally illustrates various operations that may be performed when one or more group calls are active in a VPLMN, and FIG. 10C generally illustrates various operations that may be performed when there are no group calls that are currently active in the VPLMN (e.g., when no group calls currently exist in the VPLMN, when one or more group calls currently exist in the VPLMN but are all inactive, etc.).

With reference to FIGS. 1-10C, the method 1000 may initially comprise pre-establishing one or more bearers in the HPLMN at block 1010, wherein the bearers may be pre-established in the HPLMN to support any group calls within the HPLMN that may require high-priority service. For example, block 1010 may generally correspond to the non-roaming architecture 600 (and the corresponding call flow shown in FIG. 7), wherein a PCRF in the HPLMN may be used to provide an interface between an application server and a BM-SC located within the HPLMN or the BM-SC and the application server may communicate over a direct interface. As such, the Home application server (Home AS) may initially reserve one or more TMGIs or other suitable network identifiers through the Home BM-SC (e.g., via the Home PCRF) and maintain a mapping between the reserved TMGIs and one or more network group identifiers. Furthermore, at block 1010, the Home AS may request the bearers to support the group calls within the HPLMN through the Home BM-SC (e.g., via the Home PCRF), wherein the Home BM-SC may communicate with an E-UTRAN associated with the HPLMN to pre-establish the bearers for the corresponding MBSFN area and then suitably notify the Home AS that the bearers have been pre-established.

In various embodiments, in response to the UE executing an application that requests high-priority group communication service, the UE may register for the group communication service through the Home AS or the Visited AS depending on whether the UE is registered with the Visited AS, as determined at block 1012. For example, if the UE is registered with the Visited AS, at block 1016 the Visited AS may either redirect the UE to the Home AS (e.g., based on addressing or identifying information associated with the UE, pre-provisioned policies, etc.) or allow the registration process to continue within the Visited AS. Otherwise, if the UE is not registered with the Visited AS, at block 1014 the UE may transmit network and location information associated therewith to the Home AS in addition to any group identifiers associated with group calls in which the UE may have interest or other information that may be relevant to bearer registration for group communication service (e.g., network session information, authentication data, etc.).

In various embodiments, at block 1018, the Home AS may then check whether the UE is registered in (e.g., attached to) the HPLMN. For example, in various embodiments, the Home AS may check whether the UE is registered in the HPLMN based on network session information that may have been received from the UE at block 1014, from the UE at block 1016 (e.g., if the Visited AS redirected the UE to the Home AS), or from the Visited AS at block 1016 (e.g., if the Visited AS allows the UE to register with the Visited AS). In response to the Home AS determining that a particular UE is not registered in the HPLMN, the method 1000 may proceed to block 1040 (FIG. 10B). Otherwise, if the Home AS determines that the particular UE is registered in the HPLMN, the Home AS may check whether the UE may be expected to cross a boundary to the VPLMN at block 1020. For example, the Home AS may determine whether the particular UE can be expected to cross the VPLMN boundary based on location information (e.g., whether the UE is located near the VPLMN boundary), mobility information (e.g., whether the UE is moving in a direction towards the VPLMN boundary), usage policies (e.g., the Home AS has been configured to provide the UE with all relevant information about group calls, even in the VPLMN), history information (e.g., the UE has a tendency to frequently roam into other networks), and/or any other relevant factors.

In various embodiments, in response to determining that the UE may be expected to cross the VPLMN boundary (block 1020: Yes), the Home AS may then determine whether any groups in which the UE has registered interest are supported, running, or otherwise active in the VPLMN at block 1022. In the affirmative (block 1022: Yes), the UE may pre-register with the Home AS or the Visited AS for group communication services at block 1023 and the Home AS may then provide the UE with bearer information about the groups of interest that are supported, running, or otherwise active in the VPLMN at block 1024. For example, if the VPLMN supports eMBMS service, the bearer information provided to the UE at block 1024 may include the TMGI(s) associated with the interested groups that are active in the VPLMN, a User Service Description (USD) for eMBMS in the VPLMN (e.g., session description information that specifies session keys, authentication or identification requirements, or other relevant data requirements in the VPLMN), or any other information that may be relevant to the bearers associated with the interested groups active in the VPLMN. Alternatively, if the VPLMN does not support eMBMS service (e.g., the VPLMN only supports unicast service), the bearer information provided to the UE at block 1024 may notify the UE that unicast service will be used in the VPLMN.

In various embodiments, in response to suitably providing the UE with the bearer information about the groups of interest that are supported, running, or otherwise active in the VPLMN at block 1024, the Home AS may then provide the UE with all relevant information about registration and bearers in the HPLMN at block 1026.

Alternatively, returning to blocks 1020 and 1022 (block 1020: No or block 1022: No), the Home AS may provide the relevant HPLMN registration and bearer information to the UE at block 1026 without providing the UE with the bearer information associated with any active groups in the VPLMN in response to determining that the UE is not expected to cross the VPLMN boundary or that there are no active groups in the VPLMN. In any case, because the HPLMN can be assumed to support eMBMS service, the HPLMN registration and bearer information provided to the UE at block 1026 may include the mappings between the TMGI(s) and the eMBMS bearers that were pre-established in the HPLMN, a Minimum Set of Data (MSD) in the HPLMN, or any other information that may enable the UE to start or continue a group call in the HPLMN. Accordingly, the UE may then have all the relevant information to start or continue a group call in the HPLMN, and the UE may further optionally have all the relevant information to start or continue a group call in the VPLMN (e.g., if the UE is expected to cross the VPLMN boundary and the UE has registered interest in one or more groups that are active in the VPLMN).

Accordingly, at block 1028, the Home AS may continue to support and monitor calls in the HPLMN, and the Home AS may subsequently determine whether the UE has moved and attached to the VPLMN at block 1030. In response to the Home AS determining that the UE has moved and attached to the VPLMN (block 1030: Yes), the method 1000 may then proceed to block 1040 (FIG. 10B). Otherwise, if the UE has not moved and/or attached to the VPLMN (block 1030: No), the Home AS may continue to support and monitor calls in the HPLMN at block 1028 and iteratively check whether the UE has moved and attached to the VPLMN 1030 (e.g., at periodic or scheduled intervals, in response to receiving an update message from the UE indicating that the UE has moved and attached to the VPLMN, or based on any other suitable criteria).

Block 1040 may generally be initiated in response to block 1018 resulting in a determination that the UE is not registered in the HPLMN or alternatively in response to block 1030 resulting in a determination that the UE has moved and attached to the VPLMN. In either case, at block 1040, the Home AS may determine whether there are any group calls in which the (roaming) UE has registered interest that are already active in the VPLMN. In response to determining that there are no active group calls in the VPLMN in which the UE has registered interest (block 1040: No), the method 1000 may then proceed to block 1060 (FIG. 10C). Otherwise (block 1040: Yes), the roaming UE may be added to an active participant count in the VPLMN for a particular group at block 1042, unless the roaming UE has already been added to the active participant count, in which case block 1042 may be skipped. In response to suitably incrementing the active participant count for the particular group to which the roaming UE was added (or alternatively determining that the active participant count does not need to be incremented because the roaming UE was already included therein), the Home AS may determine whether a multicast bearer has been established for the group at block 1044.

In response to determining that a multicast bearer has not been established for the group (block 1044: No), the Home AS may then check whether the active participant count or the number of members (i.e., non-participants but defined in the group list) associated with the group indicates a sufficient user density to trigger establishing the multicast bearer in the VPLMN at block 1046. For example, at block 1046, the Home AS may determine whether the active participant count per group in the respective PLMN has met a multicast bearer establishment threshold for the corresponding MBSFN area. In response to determining that the active participant count per group in the respective PLMN has met the applicable multicast bearer establishment threshold (block 1046: Yes), the Home AS may communicate with the BM-SC and/or the PCRF in the VPLMN to establish the multicast bearer at block 1050 and then notify all UEs in the corresponding PLMNs that eMBMS service is available at block 1052. For example, at block 1052, the UEs in the corresponding PLMNs may be provided mappings between the appropriate TMGIs and multicast bearers that were established to support eMBMS service for the group calls.

Alternatively, returning to block 1044, the UEs in the corresponding PLMNs may be notified that eMBMS service is available at block 1052 in response to the Home AS determining that the multicast bearer has already been established for the group (i.e., establishing the multicast bearer at block 1050 may be unnecessary because the multicast bearer already exists) (block 1044: Yes).

In another alternative, returning to block 1046, the Home AS may notify the UEs in the corresponding PLMNs that group calls are only supported over unicast service at block 1048 if the active participant count per group in the respective PLMN has not met the multicast bearer establishment threshold (or if the VPLMN does not support eMBMS service) (block 1046: No).

In any case, the Home AS may continue to support group calls in the VPLMN at block 1054 after suitably notifying the UEs in the corresponding PLMNs about whether the group calls are only supported over unicast service or the availability of the multicast bearers that may support eMBMS service for the group calls, wherein the method 1000 may then proceed to block 1062 (FIG. 10C).

Blocks 1060-1064 may generally be performed when there are no currently active group calls in the VPLMN (e.g., when no group calls currently exist in the VPLMN, when one or more group calls currently exist in the VPLMN but are all inactive, etc.). For example, in response to block 1040 resulting in a determination that 1040 that there are no active group calls in the VPLMN in which the UE has registered interest, the method 1000 may comprise determining whether there are multicast bearers available for inactive group calls in any VPLMN at block 1060. Accordingly, in response to determining that one or more inactive group calls have an available multicast bearer (block 1060: Yes), the method 1000 may return to block 1052 (FIG. 10B) and proceed in substantially the same manner described (e.g., all UEs in the corresponding PLMNs may be notified that eMBMS service is available and provided with mappings between the appropriate TMGIs and the available multicast bearers that were established to support eMBMS service for the inactive group calls).

Otherwise, if there are no inactive group calls in the VPLMN that have an available multicast bearer (block 1060: No), monitoring for group calls in the VPLMN may be performed at block 1062. Furthermore, monitoring for the group calls in the VPLMN may alternatively (or additionally) be performed at block 1062 after the Home AS has indicated continued support for group calls in the VPLMN at block 1054 (FIG. 10B) once the UEs in the corresponding PLMNs have been suitably notified about whether the group calls are only supported over unicast service or multicast bearers that may support eMBMS service.

In various embodiments, in response to determining at block 1064 that a new group call request has been made in the VPLMN (block 1064: Yes), the method 1000 may return to block 1042 (FIG. 10B) and proceed in substantially the same manner described (e.g., the active participant count may be appropriately incremented and checked against the multicast bearer establishment threshold to determine whether to establish a multicast bearer or notify the UEs that the requested group call will only be supported over unicast service). Otherwise, if a new group call request has not been made in the VPLMN (block 1064: No), monitoring for new group call requests in the VPLMN may be continued at block 1062 until a new group call request has been detected in the VPLMN at block 1064, at which time the method 1000 may return to block 1042 (FIG. 10B) and proceed in the manner described.

Figure 11:
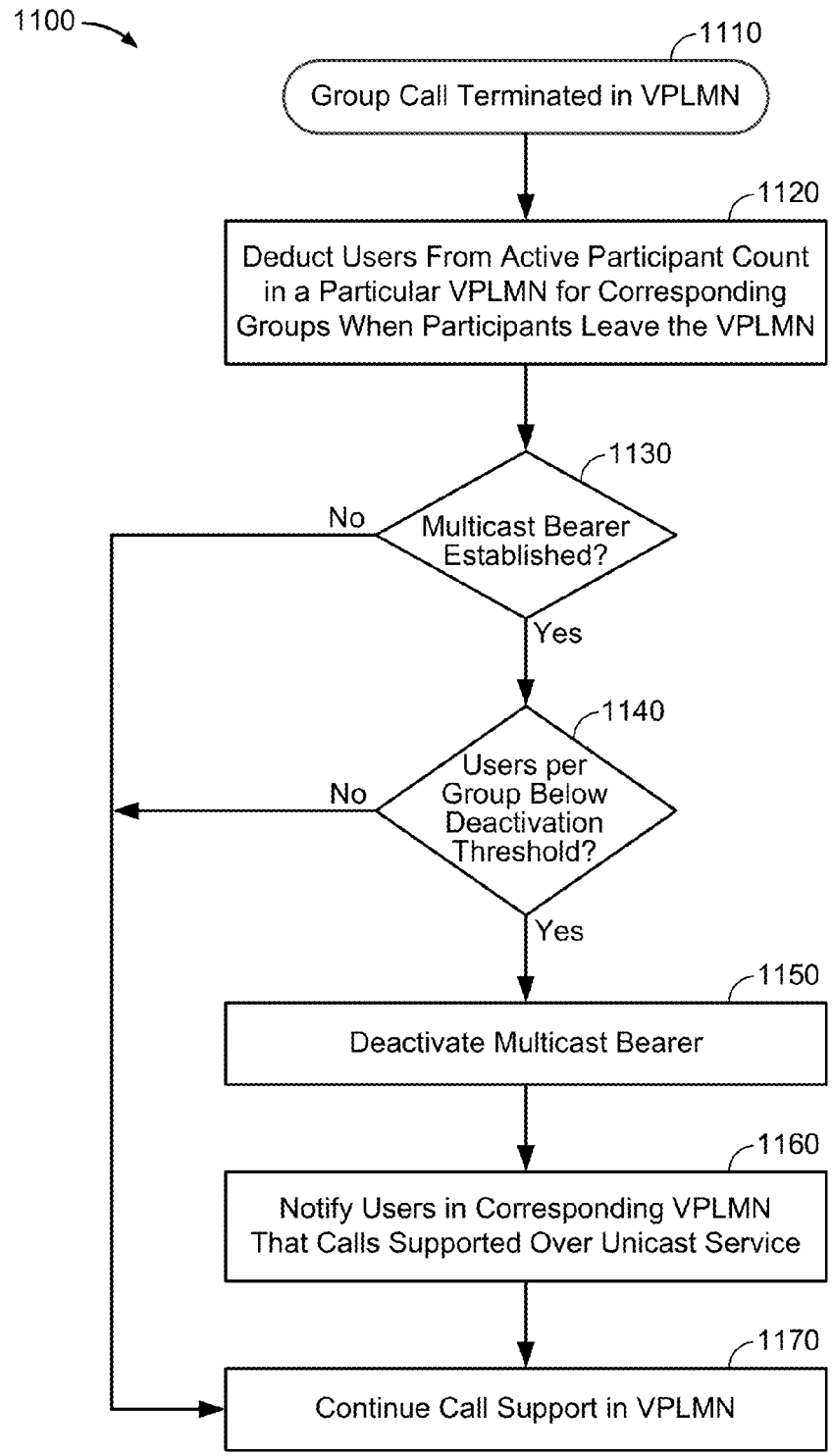
FIG. 11 illustrates an exemplary method that may control whether to deactivate an eMBMS bearer that was established to support a group communication in a roaming network according to various embodiments.

According to various embodiments, FIG. 11 illustrates an exemplary method 1100 that may control whether to deactivate an eMBMS bearer that was established to support a group communication in a roaming network. With reference to FIGS. 1-11, in response to determining that a group call in the VPLMN has terminated or otherwise become inactive at block 1110, the users that were participating in the group call may be deducted from the active participant count when the users leave the PLMN at any time in a particular VPLMN for a specific group at block 1120. In response to determining that a multicast bearer was established for the group at block 1130 (block 1130: Yes), the number of users per group in the respective PLMN may be checked against the multicast bearer establishment threshold at block 1140. Accordingly, if the number of users per group in the respective PLMN has fallen below the threshold (block 1140: Yes), the multicast bearer may be deactivated at block 1150 and the users may then be notified that group calls are only supported over unicast service at block 1160.

Alternatively, in response to block 1130 resulting in a determination that a multicast bearer was not established for the group (block 1130: No), the application server may continue to monitor and support the calls in the VPLMN at block 1170. In a further alternative, if the number of users per group in the respective PLMN has not fallen below the threshold (block 1140: No), the multicast bearer may be maintained (e.g., in an inactive state with no user plane data such that the multicast bearer can be made available when a new group call is requested in the VPLMN, etc.), in which case the block 1150 to deactivate the multicast bearer may be skipped and block 1160 to notify users that group calls in the corresponding VPLMN will be supported over unicast service may likewise be skipped. In any of the above-mentioned scenarios, group calls in the VPLMN may continue to be supported at block 1170 using substantially similar mechanisms to those described in further detail above.

Figure 12A:
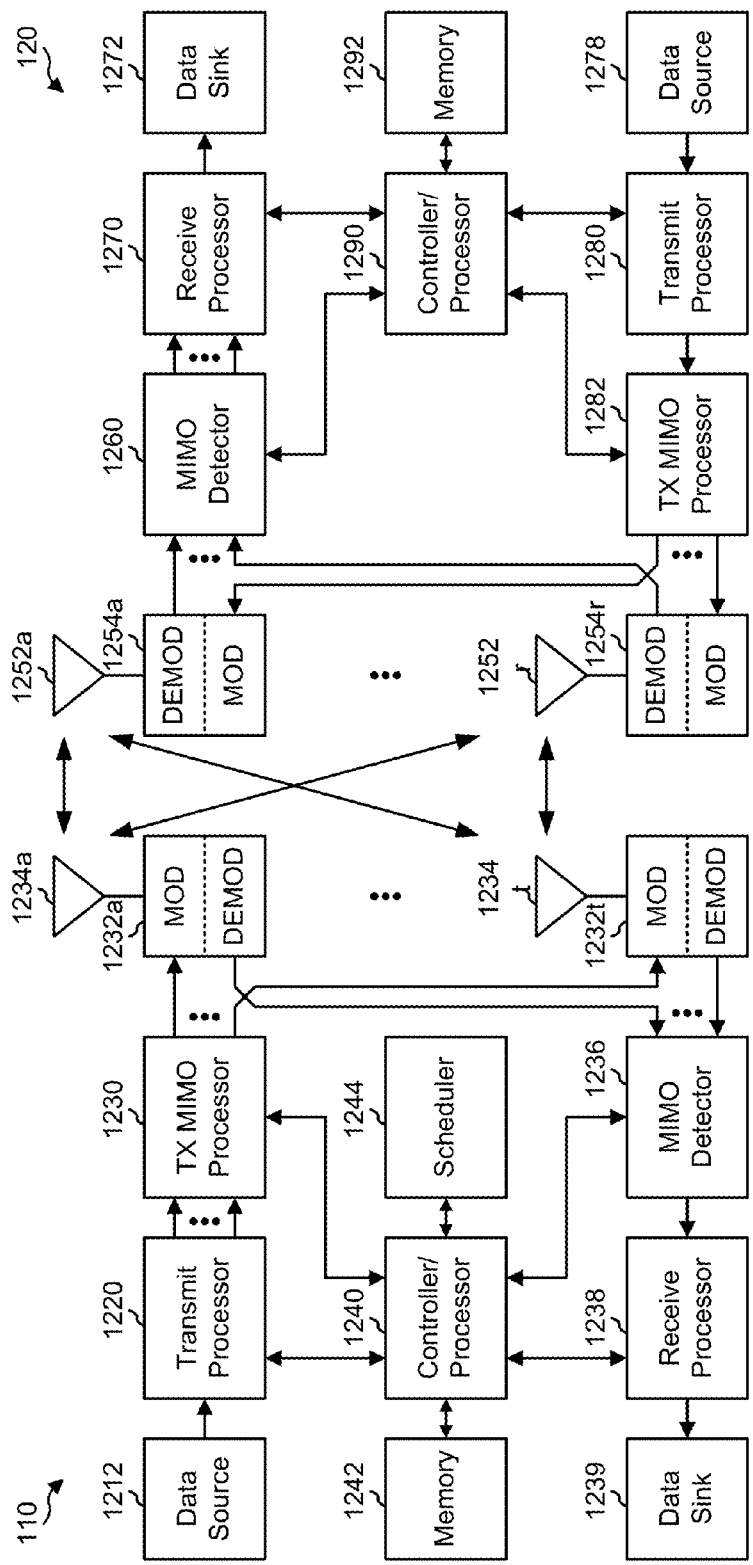
FIG. 12A illustrates an exemplary block diagram of a design of an eNode B and a user equipment (UE) according to various embodiments.

FIG. 12A illustrates a block diagram of an exemplary design of an eNode B 110 and a UE 120, which may be one of the eNBs and one of the UEs discussed herein in relation to the various embodiments. With reference to FIGS. 1-12A, in this design, the eNode B 110 is equipped with T antennas 1234a through 1234t, and the UE 120 is equipped with R antennas 1252a through 1252r, where T and R are generally greater than or equal to 1.

At the Node B 110, a transmit processor 1220 may receive data for unicast services and data for broadcast and/or multicast services from a data source 1212 (e.g., directly or indirectly from an application server 150). The transmit processor 1220 may process the data for each service to obtain data symbols. The transmit processor 1220 may also receive scheduling information, configuration information, control information, system information and/or other overhead information from a controller/processor 1240 and/or a scheduler 1244. The transmit processor 1220 may process the received overhead information and provide overhead symbols. A transmit (TX) multiple-input multiple-output (MIMO) processor 1230 may multiplex the data and overhead symbols with pilot symbols, process (e.g., precode) the multiplexed symbols, and provide T output symbol streams to T modulators (MOD) 1232a through 1232t. Each modulator 1232 may process a respective output symbol stream (e.g., for OFDM) to obtain an output sample stream. Each modulator 1232 may further process (e.g., convert to analog, amplify, filter, and upconvert) the output sample stream to obtain a downlink signal. T downlink signals from the modulators 1232a through 1232t may be transmitted via the T antennas 1234a through 1234t, respectively.

At the UE 120, the antennas 1252a through 1252r may receive the downlink signals from the eNode B 110 and provide received signals to demodulators (DEMOD) 1254a through 1254r, respectively. Each demodulator 1254 may condition (e.g., filter, amplify, downconvert, and digitize) a respective received signal to obtain received samples and may further process the received samples (e.g., for OFDM) to obtain received symbols. A MIMO detector 1260 may receive and process the received symbols from the R demodulators 1254a through 1254r and provide detected symbols. A receive processor 1270 may process the detected symbols, provide decoded data for the UE 120 and/or desired services to a data sink 1272, and provide decoded overhead information to a controller/processor 1290. In general, the processing by the MIMO detector 1260 and the receive processor 1270 is complementary to the processing by the TX MIMO processor 1230 and the transmit processor 1220 at the eNode B 110.

On the uplink, at the UE 120, data from a data source 1278 and overhead information from the controller/processor 1290 may be processed by a transmit processor 1280, further processed by a TX MIMO processor 1282 (if applicable), conditioned by the modulators 1254a through 1254r, and transmitted via the antennas 1252a through 1252r. At the eNode B 110, the uplink signals from the UE 120 may be received by the antennas 1234, conditioned by the demodulators 1232, detected by a MIMO detector 1236, and processed by a receive processor 1238 to obtain the data and overhead information transmitted by the UE 120.

The controllers/processors 1240 and 1290 may direct the operation at the eNode B 110 and the UE 120, respectively. The scheduler 1244 may schedule the UE 120 for downlink and/or uplink transmission, schedule transmission of broadcast and multicast services, and provide assignments of radio resources for the scheduled UE 120 and services. The controller/processor 1240 and/or the scheduler 1244 may generate scheduling information and/or other overhead information for the broadcast and multicast services.

The controller/processor 1290 may implement processes for the techniques described herein. Memories 1242 and 1292 may store data and program codes for the eNode B 110 and the UE 120, respectively. Accordingly, group communications in the eMBMS environment can be accomplished in accordance with the various embodiments described herein, while still remaining compliant with the existing standards.

Figure 12B:
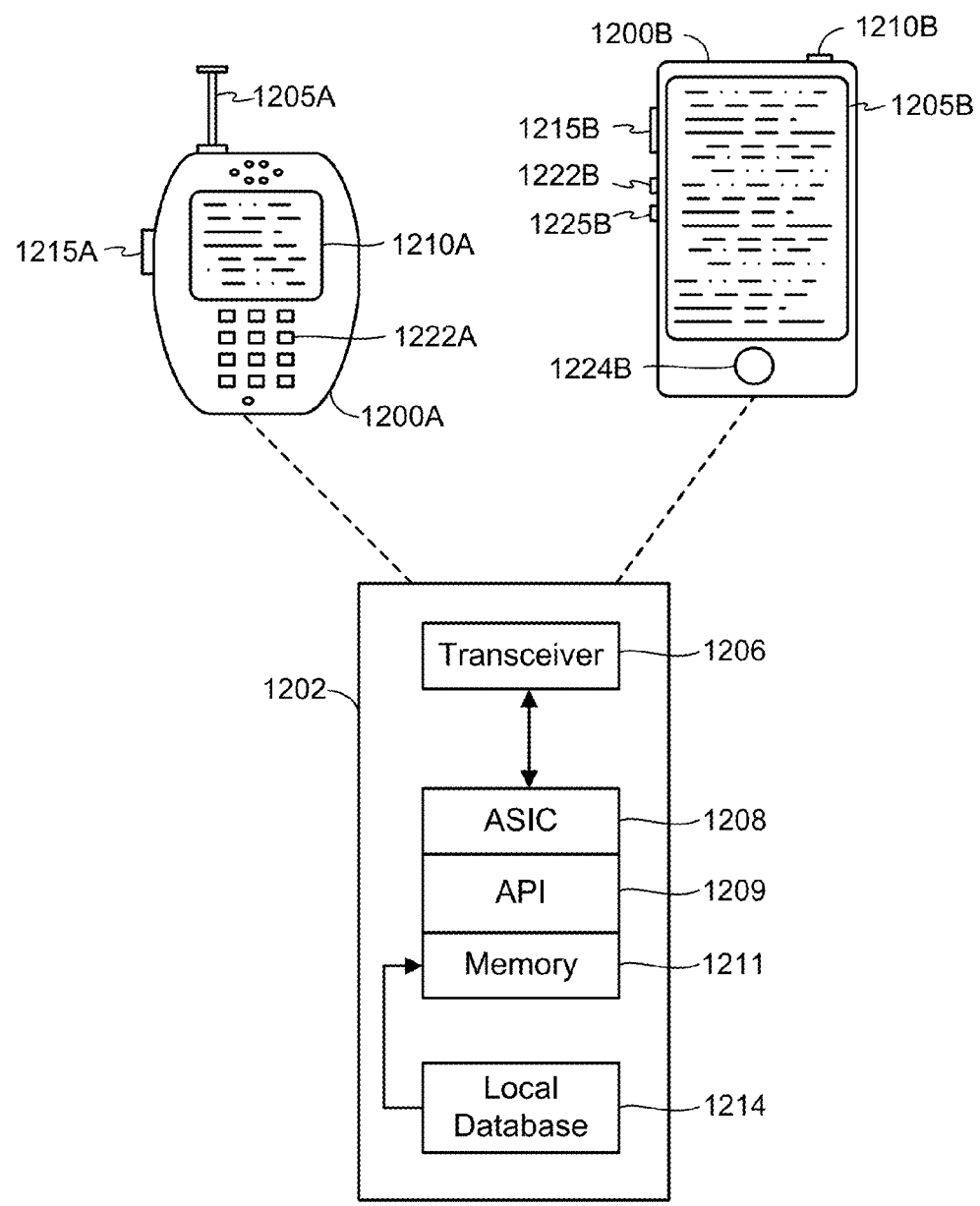
FIG. 12B illustrates exemplary UEs according to various embodiments.

FIG. 12B illustrates additional exemplary UEs in accordance with various embodiments. Referring to FIGS. 1-12B, UE 1200A (e.g., UE 120, 520, 522, etc.) is illustrated as a calling telephone and UE 1200B is illustrated as a touchscreen device (e.g., a smart phone, a tablet computer, etc.). As shown, an external casing of the UE 1200A is configured with an antenna 1205A, a display 1210A, at least one button 1215A (e.g., a PTT button, a power button, a volume control button, etc.), and a keypad 1222A, among other components, as is known in the art. Also, an external casing of the UE 1200B is configured with a touchscreen display 1205B, peripheral buttons 1210B, 1215B, 1222B and 1225B (e.g., a power control button, a volume or vibrate control button, an airplane mode toggle button, etc.), and at least one front-panel button 1224B (e.g., a Home button, etc.), among other components, as is known in the art. While not shown explicitly as part of the UE 1200B, the UE 1200B can include one or more external antennas and/or one or more integrated antennas that are built into the external casing of the UE 1200B, including but not limited to Wi-Fi antennas, cellular antennas, satellite position system (SPS) antennas (e.g., global positioning system (GPS) antennas), and so on.

While internal components of UEs such as the UEs 1200A and 1200B can be embodied with different hardware configurations, a basic high-level UE configuration for internal hardware components is shown as platform 1202. The platform 1202 can receive and execute software applications, data and/or commands transmitted from the RAN that may ultimately come from the core network, the Internet, and/or other remote servers and networks (e.g., an application server, web URLs, etc.). The platform 1202 can also independently execute locally stored applications without RAN interaction. The platform 1202 can include a transceiver 1206 operably coupled to an application specific integrated circuit (ASIC) 1208, or other processor, microprocessor, logic circuit, or other data processing device. The ASIC 1208 or other processor executes the application programming interface (API) 1209 layer that interfaces with any resident programs in the memory 1211 of the wireless device. The memory 1211 can be comprised of read-only memory (ROM) or random-access memory (RAM), electrically erasable programmable ROM (EEPROM), flash cards, or any memory common to computer platforms. The platform 1202 also can include a local database 1214 that can store applications not actively used in memory 1211, as well as other data. The local database 1214 is typically a flash memory cell, but can be any secondary storage device as known in the art, such as magnetic media, EEPROM, optical media, tape, soft or hard disk, or the like.

Accordingly, various embodiments can include a UE (e.g., UE 120, 520, 522, 1200A, 1200B, etc.) including the ability to perform the functions described herein. As will be appreciated by those skilled in the art, the various logic elements can be embodied in discrete elements, software modules executed on a processor or any combination of software and hardware to achieve the functionality described herein. For example, ASIC 1208, memory 1211, API 1209 and local database 1214 may all be used cooperatively to load, store and execute the various functions described herein and thus the logic to perform these functions may be distributed over various elements. Alternatively, the functionality could be incorporated into one discrete component. Therefore, the features of the UEs in FIGS. 1-12B are to be considered merely illustrative and are not limited to the illustrated features or arrangement.

The wireless communication between the UEs 1200A and/or 1200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to be limiting and are merely provided to aid in describing various exemplary embodiments.

Figure 13:
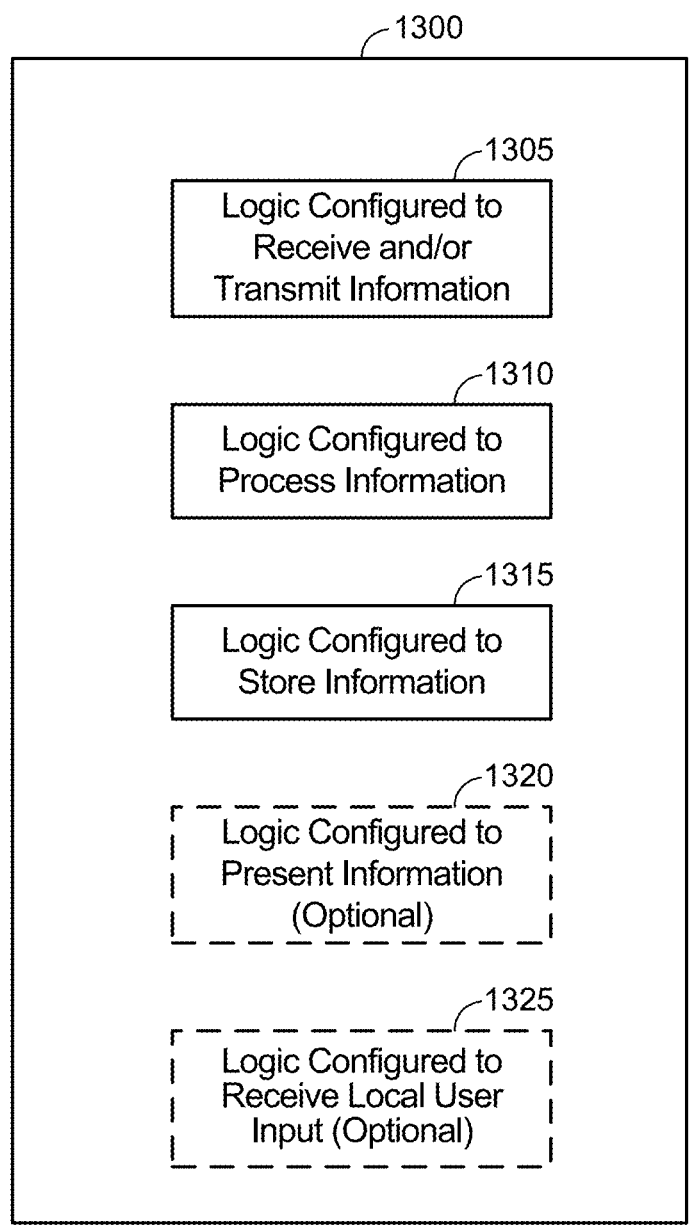
FIG. 13 illustrates an exemplary communication device that includes logic configured to perform functionality according to various embodiments.

FIG. 13 illustrates a communication device 1300 that includes logic configured to perform functionality. With reference to FIGS. 1-13, the communication device 1300 can correspond to any of the above-noted communication devices, including but not limited to UEs 120, 1200A, 1200B, Node Bs or base stations 110, network controller 130 (e.g., a radio network controller (RNC), a base station controller (BSC), etc.), a packet data network end-point (e.g., SGSN, GGSN, a Mobility Management Entity (MME) in LTE, etc.), application server 150, etc. Thus, communication device 1300 can correspond to any electronic device that is configured to communicate with (or facilitate communication with) one or more other entities over a network.

The communication device 1300 includes logic configured to receive and/or transmit information 1305. In an example, if the communication device 1300 corresponds to a wireless communications device (e.g., UE 120, UE 1200A, UE 1200B, Node B 110, etc.), the logic configured to receive and/or transmit information 1305 can include a wireless communications interface (e.g., Bluetooth, Wi-Fi, 2G, 3G, 4G, LTE, etc.) such as a wireless transceiver and associated hardware (e.g., an RF antenna, a MODEM, a modulator and/or demodulator, etc.). In another example, the logic configured to receive and/or transmit information 1305 can correspond to a wired communications interface (e.g., a serial connection, a USB or Firewire connection, an Ethernet connection through which the Internet 175 can be accessed, etc.). Thus, if the communication device 1300 corresponds to some type of network-based server (e.g., application server 150, etc.), the logic configured to receive and/or transmit information 1305 can correspond to an Ethernet card, in an example, that connects the network-based server to other communication entities via an Ethernet protocol. In a further example, the logic configured to receive and/or transmit information 1305 can include sensory or measurement hardware by which the communication device 1300 can monitor a local environment (e.g., an accelerometer, a temperature sensor, a light sensor, an antenna for monitoring local RF signals, etc.). The logic configured to receive and/or transmit information 1305 can also include software that, when executed, permits the associated hardware of the logic configured to receive and/or transmit information 1305 to perform reception and/or transmission function(s). However, the logic configured to receive and/or transmit information 1305 does not correspond to software alone, and the logic configured to receive and/or transmit information 1305 relies at least in part upon hardware to achieve the functionality associated therewith.

The communication device 1300 further includes logic configured to process information 1310. In an example, the logic configured to process information 1310 can include at least a processor. Example implementations of the type of processing that can be performed by the logic configured to process information 1310 includes but is not limited to performing determinations, establishing connections, making selections between different information options, performing evaluations related to data, interacting with sensors coupled to the communication device 1300 to perform measurement operations, converting information from one format to another (e.g., between different protocols such as .wmv to .avi, etc.), and so on. For example, the processor included in the logic configured to process information 1310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1310 can also include software that, when executed, permits the associated hardware of the logic configured to process information 1310 to perform processing function(s). However, the logic configured to process information 1310 does not correspond to software alone, and the logic configured to process information 1310 relies at least in part upon hardware to achieve the functionality associated therewith.

The communication device 1300 further includes logic configured to store information 1315. In an example, the logic configured to store information 1315 can include at least a non-transitory memory and associated hardware (e.g., a memory controller, etc.). For example, the non-transitory memory included in the logic configured to store information 1315 can correspond to RAM memory, flash memory, ROM memory, EPROM memory, EEPROM memory, registers, hard disk, a removable disk, a CD-ROM, or any other form of storage medium known in the art. The logic configured to store information 1315 can also include software that, when executed, permits the associated hardware of the logic configured to store information 1315 to perform storage function(s). However, the logic configured to store information 1315 does not correspond to software alone, and the logic configured to store information 1315 relies at least in part upon hardware to achieve the functionality associated therewith.

The communication device 1300 further optionally includes logic configured to present information 1320. In an example, the logic configured to present information 1320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1300. For example, if the communication device 1300 corresponds to UE 1200A or UE 1200B, the logic configured to present information 1320 can include the display 1210A of UE 1200A or the touchscreen display 1205B of UE 1200B. In a further example, the logic configured to present information 1320 can be omitted for certain communication devices, such as network communication devices that do not have a local user (e.g., network switches or routers, remote servers, etc.). The logic configured to present information 1320 can also include software that, when executed, permits the associated hardware of the logic configured to present information 1320 to perform presentation function(s). However, the logic configured to present information 1320 does not correspond to software alone, and the logic configured to present information 1320 relies at least in part upon hardware to achieve functionality associated therewith.

The communication device 1300 further optionally includes logic configured to receive local user input 1325. In an example, the logic configured to receive local user input 1325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1300. For example, if the communication device 1300 corresponds to UE 1200A or UE 1200B, the logic configured to receive local user input 1325 can include the keypad 1222A, any of the buttons 1215A or 1210B through 1225B, the touchscreen display 1205B, etc. In a further example, the logic configured to receive local user input 1325 can be omitted for certain communication devices, such as network communication devices that do not have a local user (e.g., network switches or routers, remote servers, etc.). The logic configured to receive local user input 1325 can also include software that, when executed, permits the associated hardware of the logic configured to receive local user input 1325 to perform input reception function(s). However, the logic configured to receive local user input 1325 does not correspond to software alone, and the logic configured to receive local user input 1325 relies at least in part upon hardware to achieve the functionality associated therewith.

While the configured logics of 1305 through 1325 are shown as separate or distinct blocks, those skilled in the art will appreciate that the hardware and/or software by which the respective configured logic performs the functionality associated therewith can overlap in part. For example, any software used to facilitate the functionality of the configured logics of 1305 through 1325 can be stored in the non-transitory memory associated with the logic configured to store information 1315, such that the configured logics of 1305 through 1325 each performs their functionality (i.e., in this case, software execution) based in part upon the operation of software stored by the logic configured to store information 1305. Likewise, hardware that is directly associated with one of the configured logics can be borrowed or used by other configured logics from time to time. For example, the processor of the logic configured to process information 1310 can format data into an appropriate format before being transmitted by the logic configured to receive and/or transmit information 1305, such that the logic configured to receive and/or transmit information 1305 performs the functionality associated therewith (i.e., in this case, transmission of data) based in part upon the operation of hardware (i.e., the processor) associated with the logic configured to process information 1310.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic."

Figure 14:
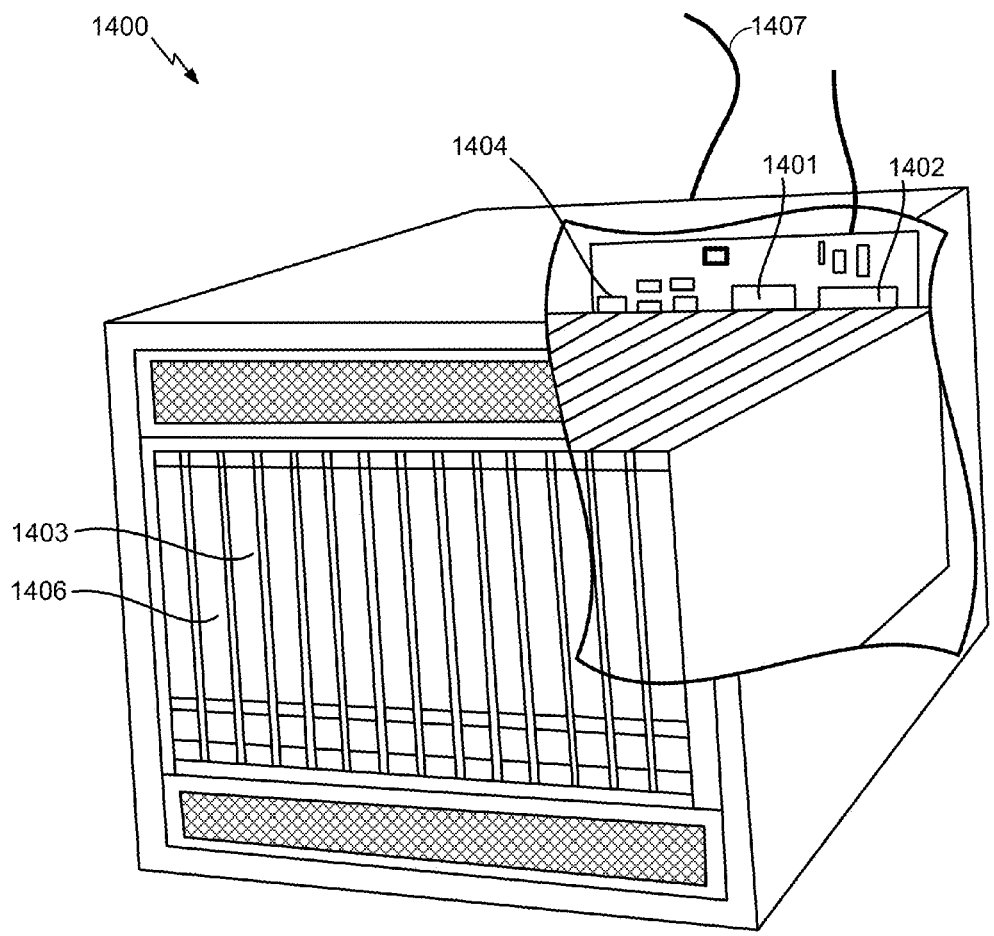
FIG. 14 illustrates an exemplary server according to various embodiments.

Various embodiments may be implemented on any of a variety of commercially available server devices, such as server 1400 illustrated in FIG. 14. With reference to FIGS. 1-14, in an example, the server 1400 may correspond to one example configuration of the application server 150 described above. The server 1400 includes a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 coupled to the processor 1401 for establishing data connections with a network 1407, such as a local area network coupled to other broadcast system computers and servers or to the Internet. Those skilled in the art will appreciate that the server 1400 illustrates one example implementation of the communication device 1300, whereby the logic configured to transmit and/or receive information 1305 corresponds to the network access points 1404 used by the server 1400 to communicate with the network 1407, the logic configured to process information 1310 corresponds to the processor 1401, and the logic configuration to store information 1315 corresponds to any combination of the volatile memory 1402, the disk drive 1403 and/or the disc drive 1406. The optional logic configured to present information 1320 and the optional logic configured to receive local user input 1325 are not explicitly shown and may or may not be included therein. Thus, FIG. 14 helps to demonstrate that the communication device 1300 may be implemented as a server, in addition to a UE implementation as in 1205A or 1205B as in FIG. 12B.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects and embodiments described herein may be implemented as electronic hardware, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the aspects and/or embodiments described herein.

The various illustrative logical blocks, modules, and circuits described in connection with the embodiments described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, actions, and/or algorithms described in connection with the embodiments described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing description shows various illustrative aspects and embodiments, those skilled in the art will appreciate that various changes and modifications could be made herein without departing from the scope of the various aspects and embodiments described herein as defined by the appended claims. The functions, steps and/or actions of the method claims in accordance with the various aspects and embodiments described herein need not be performed in any particular order. Furthermore, although certain elements may be described or claimed in the singular, the plural is contemplated unless limitation to the singular is explicitly stated.

What is claimed is:

1. A method for seamless and resource efficient roaming for group call services in an evolved multimedia broadcast/multicast service (eMBMS) network, comprising:
   determining, at a server located in a Home Public Land Mobile Network (HPLMN), that a user equipment (UE) associated with the HPLMN is expected to cross a boundary from a current PLMN to a Visited PLMN (VPLMN), wherein the UE has registered to participate in a group call in the current PLMN;
   detecting that the UE has roamed to the VPLMN;
   determining, at the server in the HPLMN, whether to establish a multicast bearer in the VPLMN in response to the UE having pre-registered for eMBMS services in the VPLMN prior to crossing the boundary to the VPLMN, wherein the server determines whether to establish the multicast bearer based at least in part on a number of group call participants in the VPLMN;
   providing the UE with information about one or more bearers that will support the group call in the VPLMN; and
   determining that the UE is registered in the current PLMN, wherein the information about the one or more bearers that will support the group call in the VPLMN is provided to the UE in response to the UE registering interest in one or more groups supported or active in the VPLMN prior to crossing the boundary to the VPLMN.

2. The method recited in claim 1, further comprising:
   establishing the multicast bearer in the VPLMN in response to the number of group call participants in the VPLMN exceeding a threshold.

3. The method recited in claim 2, wherein the information about the one or more bearers that will support the group call in the VPLMN comprises information about the multicast bearer established in the VPLMN.

4. The method recited in claim 2, further comprising:
determining that the group call has terminated in the VPLMN; and
deactivating the multicast bearer in the VPLMN in response to determining that a number of active group call participants in the VPLMN does not exceed the threshold.

5. The method recited in claim 4, further comprising:
notifying the UE that group calls in the VPLMN will be supported over unicast service in response to deactivating the multicast bearer.

6. The method recited in claim 2, further comprising:
determining that the group call has terminated in the VPLMN; and
maintaining the multicast bearer established in the VPLMN in response to determining that a number of roaming users in the VPLMN exceeds the threshold.

7. The method recited in claim 2, wherein establishing the multicast bearer in the VPLMN comprises:
communicating with a broadcast/multicast service center (BM-SC) located in the VPLMN over a direct interface to request the multicast bearer, wherein the BM-SC in the VPLMN communicates with an evolved universal terrestrial radio access network (E-UTRAN) associated with the VPLMN to establish the multicast bearer; and
receiving, at the HPLMN, information about the multicast bearer established in the VPLMN from the E-UTRAN associated with the VPLMN.

8. The method recited in claim 1, further comprising:
determining that the UE has not registered interest in an active group call in the VPLMN and that one or more inactive multicast bearers are available in the VPLMN, wherein the information about the one or more bearers that will support the group call in the VPLMN comprises information about the one or more inactive multicast bearers.

9. The method recited in claim 1, further comprising:
determining that the UE has not registered interest in an active group call in the VPLMN and that no inactive multicast bearers are available in the VPLMN; and
establishing the multicast bearer in the VPLMN in response to a new group call requested in the VPLMN having an active participant count exceeding a threshold.

10. The method recited in claim 1, further comprising:
determining that the UE has not registered interest in an active group call in the VPLMN and that no inactive multicast bearers are available in the VPLMN; and
notifying the UE that a new group call requested in the VPLMN will be supported over unicast service in response to the new group call having an active participant count that does not exceed a threshold.

11. The method recited in claim 1, further comprising:
establishing a unicast bearer in the VPLMN in response to the number of group call participants in the VPLMN not exceeding a threshold.

12. The method recited in claim 11, further comprising:
notifying the UE that the group call will be supported over the unicast bearer.

13. The method recited in claim 1, further comprising:
establishing a unicast bearer in the VPLMN in response to determining that the VPLMN does not support multicast service.

14. The method recited in claim 13, further comprising:
notifying the UE that the group call will be supported over the unicast bearer.

15. The method recited in claim 1, wherein detecting that the UE has roamed to the VPLMN comprises determining that the UE is not registered in the current PLMN or that the UE has attached to the VPLMN.

16. The method recited in claim 1, wherein the group call in the VPLMN comprises an active group call in the VPLMN or a new group call that the UE has requested in the VPLMN.

17. The method recited in claim 1, wherein the current PLMN comprises the HPLMN and the multicast bearer comprises an eMBMS multicast bearer.

18. A method for seamless and resource efficient roaming for group call services in an evolved multimedia broadcast/multicast service (eMBMS) network, comprising:
determining, at a server located in a Home Public Land Mobile Network (HPLMN), that a user equipment (UE) associated with the HPLMN is expected to cross a boundary from a current PLMN to a Visited PLMN (VPLMN), wherein the UE has registered to participate in a group call in the current PLMN;
detecting that the UE has roamed to the VPLMN;
establishing, by the server in the HPLMN, a multicast bearer in the VPLMN in response to the UE pre-registering for eMBMS services in the VPLMN based at least in part on a number of group call participants in the VPLMN exceeding a threshold, wherein establishing the multicast bearer in the VPLMN comprises:
communicating with an application server located in the VPLMN to request the multicast bearer, wherein the application server in the VPLMN communicates with a broadcast/multicast service center (BM-SC) located in the VPLMN to establish the multicast bearer; and
receiving, at the HPLMN, information about the multicast bearer established in the VPLMN via an evolved universal terrestrial radio access network (E-UTRAN) associated with the VPLMN; and
providing the UE with information about one or more bearers that will support the group call in the VPLMN.

19. A Home Public Land Mobile Network (HPLMN) for supporting seamless and resource efficient roaming for group call services in an evolved multimedia broadcast/multicast service (eMBMS) network, wherein the HPLMN comprises:
a server configured to:
determine that a user equipment (UE) associated with the HPLMN is expected to cross a boundary from a current PLMN to a Visited PLMN (VPLMN), wherein the UE has registered to participate in a group call in the current PLMN;
detect that the UE has roamed to the VPLMN;
determine whether to establish a multicast bearer in the VPLMN in response to the UE having pre-registered for eMBMS services in the VPLMN prior to crossing the boundary to the VPLMN based at least in part on a number of group call participants in the VPLMN;
provide the UE with information about one or more bearers that will support the group call in the VPLMN; and
determine that the UE is registered in the HPLMN, wherein the information about the one or more bearers that will support the group call in the VPLMN is provided to the UE in response to the UE registering interest in one or more groups that are supported or active in the VPLMN prior to crossing the boundary to the VPLMN.

20. The HPLMN recited in claim 19, further comprising:
a direct interface between the server and a broadcast/multicast service center (BM-SC) located in the VPLMN, wherein the server is further configured to:
communicate with the BM-SC located in the VPLMN over the direct interface to request the multicast bearer, wherein the BM-SC in the VPLMN communicates with an evolved universal terrestrial radio access network (E-UTRAN) associated with the VPLMN to establish the multicast bearer; and
receive information about the multicast bearer established in the VPLMN via the E-UTRAN associated with the VPLMN.

21. The HPLMN recited in claim 19, wherein the server is further configured to establish the multicast bearer in the VPLMN in response to the number of group call participants in the VPLMN exceeding a threshold.

22. The HPLMN recited in claim 21, wherein the server is further configured to:
determine that the group call has terminated in the VPLMN; and
deactivate the multicast bearer in the VPLMN in response to a number of active group call participants in the VPLMN not exceeding the threshold.

23. The HPLMN recited in claim 21, wherein the server is further configured to:
determine that the group call has terminated in the VPLMN; and
maintain the multicast bearer established in the VPLMN in response to a number of roaming users in the VPLMN exceeding the threshold.

24. The HPLMN recited in claim 19, wherein the server is further configured to:
determine that the UE has not registered interest in an active group call in the VPLMN and that one or more inactive multicast bearers are available in the VPLMN, wherein the information about the one or more bearers that will support the group call in the VPLMN comprises information about the one or more inactive multicast bearers.

25. The HPLMN recited in claim 19, wherein the server is further configured to:
determine that the UE has not registered interest in an active group call in the VPLMN and that no inactive multicast bearers are available in the VPLMN;
establish the multicast bearer in the VPLMN in response to a new group call requested in the VPLMN having an active participant count exceeding a threshold; and
notify the UE that the new group call requested in the VPLMN will be supported over unicast service in response to the active participant count associated with the new group call not exceeding the threshold.

26. The HPLMN recited in claim 19, wherein the server is further configured to:
establish a unicast bearer in the VPLMN in response to the number of group call participants in the VPLMN not exceeding a threshold.

27. The HPLMN recited in claim 19, wherein the server is further configured to:
establish a unicast bearer in the VPLMN in response to the VPLMN not supporting multicast service.

28. A server for supporting seamless and resource efficient roaming for group call services in an evolved multimedia broadcast/multicast service (eMBMS) network, comprising:

means for determining that a user equipment (UE) associated with a Home Public Land Mobile Network (HPLMN) is expected to cross a boundary from a current PLMN to a Visited PLMN (VPLMN), wherein the UE has registered to participate in a group call in the current PLMN;
means for detecting that the UE has roamed to the VPLMN;
means for communicating with an application server located in the VPLMN to establish a multicast bearer in the VPLMN in response to the UE having pre-registered for eMBMS services in the VPLMN prior to crossing the boundary to the VPLMN based at least in part on a number of group call participants in the VPLMN; and
means for providing the UE with information about one or more bearers that will support the group call in the VPLMN.

29. The server recited in claim 28, wherein the means for communicating with the application server located in the VPLMN comprises a direct interface between the server located in the HPLMN and the application server located in the VPLMN.

30. The server recited in claim 28, wherein the means for communicating with the application server located in the VPLMN comprises an interface between a Home Policy Charging Rules Function (PCRF) in the HPLMN and a Visited PCRF in the VPLMN.

31. A non-transitory computer-readable storage medium having computer-executable instructions recorded thereon, wherein executing the computer-executable instructions on a server located in a Home Public Land Mobile Network (HPLMN) causes the server to:
determine that a user equipment (UE) associated with the HPLMN is expected to cross a boundary from a current PLMN to a Visited PLMN (VPLMN), wherein the UE has registered to participate in a group call in the current PLMN;
detect that the UE has roamed to the VPLMN;
communicate with an application server located in the VPLMN to establish a multicast bearer in the VPLMN in response to the UE having pre-registered for eMBMS services in the VPLMN prior to crossing the boundary to the VPLMN based at least in part on a number of group call participants in the VPLMN; and
provide the UE with information about one or more bearers that will support the group call in the VPLMN.

32. The non-transitory computer-readable storage medium recited in claim 31, wherein the server located in the HPLMN is configured to communicate with the application server located in the VPLMN via a direct interface between the server located in the HPLMN and the application server located in the VPLMN.

33. The non-transitory computer-readable storage medium recited in claim 31, wherein the server located in the HPLMN is configured to communicate with the application server located in the VPLMN via an interface between a Home Policy Charging Rules Function (PCRF) in the HPLMN and a Visited PCRF in the VPLMN.

34. A method for seamless and resource efficient roaming for group call services in an evolved multimedia broadcast/multicast service (eMBMS) network, comprising:
determining, at a server located in a Home Public Land Mobile Network (HPLMN), that a user equipment (UE) associated with the HPLMN is expected to cross a boundary from a current PLMN to a Visited PLMN (VPLMN), wherein the UE has registered to participate in a group call in the current PLMN;
detecting that the UE has roamed to the VPLMN;
communicating with an application server located in the VPLMN to establish a multicast bearer in the VPLMN in response to the UE having pre-registered for eMBMS services in the VPLMN prior to crossing the boundary to the VPLMN based at least in part on a number of group call participants in the VPLMN; and
providing the UE with information about one or more bearers that will support the group call in the VPLMN.

35. The method recited in claim 34, wherein the server located in the HPLMN communicates with the application server located in the VPLMN over a direct interface.

36. The method recited in claim 34, wherein the server located in the HPLMN communicates with the application server located in the VPLMN via an interface between a Home Policy Charging Rules Function (PCRF) in the HPLMN and a Visited PCRF in the VPLMN.

37. A Home Public Land Mobile Network (HPLMN) for supporting seamless and resource efficient roaming for group call services in an evolved multimedia broadcast/multicast service (eMBMS) network, wherein the HPLMN comprises a server configured to:
determine that a user equipment (UE) associated with the HPLMN is expected to cross a boundary from a current PLMN to a Visited PLMN (VPLMN), wherein the UE has registered to participate in a group call in the current PLMN;
detect that the UE has roamed to the VPLMN;
communicate with an application server located in the VPLMN to establish a multicast bearer in the VPLMN in response to the UE having pre-registered for eMBMS services in the VPLMN prior to crossing the boundary to the VPLMN based at least in part on a number of group call participants in the VPLMN; and
provide the UE with information about one or more bearers that will support the group call in the VPLMN.

38. The HPLMN recited in claim 37, further comprising:
a direct interface between the server in the HPLMN and the application server located in the VPLMN, wherein the server is further configured to communicate with the application server located in the VPLMN over the direct interface to establish the multicast bearer.

39. The HPLMN recited in claim 37, further comprising:
a Home Policy Charging Rules Function (PCRF); and
an interface between the Home PCRF and a Visited PCRF residing in the VPLMN, wherein the server is further configured to communicate with the application server located in the VPLMN via the interface between the Home PCRF and the Visited PCRF to establish the multicast bearer through the application server in the VPLMN.

40. A server for supporting seamless and resource efficient roaming for group call services in an evolved multimedia broadcast/multicast service (eMBMS) network, comprising:
means for determining that a user equipment (UE) associated with a Home Public Land Mobile Network (HPLMN) is expected to cross a boundary from a current PLMN to a Visited PLMN (VPLMN), wherein the UE has registered to participate in a group call in the current PLMN;
means for detecting that the UE has roamed to the VPLMN;
means for determining whether to establish a multicast bearer in the VPLMN in response to the UE having pre-registered for eMBMS services in the VPLMN prior to crossing the boundary to the VPLMN based at least in part on a number of group call participants in the VPLMN;
means for providing the UE with information about one or more bearers that will support the group call in the VPLMN; and
means for determining that the UE is registered in the current PLMN, wherein the information about the one or more bearers that will support the group call in the VPLMN is provided to the UE in response to the UE registering interest in one or more groups supported or active in the VPLMN prior to crossing the boundary to the VPLMN.

41. A non-transitory computer-readable storage medium having computer-executable instructions recorded thereon, wherein executing the computer-executable instructions on a server located in a Home Public Land Mobile Network (HPLMN) causes the server to:
determine that a user equipment (UE) associated with the HPLMN is expected to cross a boundary from a current PLMN to a Visited PLMN (VPLMN), wherein the UE has registered to participate in a group call in the current PLMN;
detect that the UE has roamed to the VPLMN;
determine whether to establish a multicast bearer in the VPLMN in response to the UE having pre-registered for eMBMS services in the VPLMN prior to crossing the boundary to the VPLMN based at least in part on a number of group call participants in the VPLMN;
provide the UE with information about one or more bearers that will support the group call in the VPLMN; and
determine that the UE is registered in the current PLMN, wherein the information about the one or more bearers that will support the group call in the VPLMN is provided to the UE in response to the UE registering interest in one or more groups supported or active in the VPLMN prior to crossing the boundary to the VPLMN.

* * * * *